US007441328B2

(12) United States Patent
Hasegawa

(10) Patent No.: US 7,441,328 B2
(45) Date of Patent: Oct. 28, 2008

(54) INSULATOR-COMBINING APPARATUS

(75) Inventor: Hiroshi Hasegawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/896,317

(22) Filed: Aug. 31, 2007

(65) Prior Publication Data

US 2008/0060191 A1 Mar. 13, 2008

(30) Foreign Application Priority Data

Aug. 31, 2006 (JP) ............................. 2006-236117

(51) Int. Cl.
*B23P 19/00* (2006.01)

(52) U.S. Cl. ............................. 29/748; 29/749; 29/754; 29/755; 29/861; 29/33 M

(58) Field of Classification Search ................... 29/705, 29/710–715, 721, 740–742, 745–748, 729, 29/739, 833, 845; 414/737, 752; 294/4, 294/64.1
See application file for complete search history.

(56) References Cited

U.S. PATENT DOCUMENTS 4,476,629 A * 10/1984 Suzuki et al. ................. 29/863
5,509,192 A * 4/1996 Ota et al. ....................... 29/741
5,724,722 A * 3/1998 Hashimoto ................... 29/740
5,737,829 A * 4/1998 Wolfe et al. ................... 29/741

FOREIGN PATENT DOCUMENTS

JP 2001-345157 12/2001

* cited by examiner

*Primary Examiner*—Minh Trinh
(74) *Attorney, Agent, or Firm*—Edwards Angell Palmer & Dodge LLP

(57) ABSTRACT

An insulator-combining apparatus which can correctly detects whether or not insulators are lined up in a predetermined sequence is provided. The plate-combining apparatus includes a plate-setting jig which includes a frame, holder, combining part and erroneous attaching-preventing part. The holders hold insulating plates and are provided being spaced from each other and supported by the frame capable of approaching and leaving each other. The combining part includes a pair of nipping members which positions the holder therebetween so as to cause the holders to approach each other. The erroneous attaching-preventing part prevents the holders from approaching each other when an incorrect insulating plate is attached on the holder.

4 Claims, 21 Drawing Sheets

INSULATOR-COMBINING APPARATUS

BACKGROUND OF THE INVENTION (1) Field of the Invention

The present invention relates to an insulator-combining apparatus for assembling a connector for use in a wiring harness by laminating insulators.

(2) Description of the Related Art

A motor vehicle as a mobile unit is provided with a wiring harness for transmitting electric power from an electric source such as a battery to electronic equipment such as various lamps and motors to be mounted on the motor vehicle. The wiring harness includes a plurality of electric wires, a plurality of terminals attached to respective electric wires, and a connector housing which receives the terminals. The connector housing and a plurality of the terminals constitute a connector. In general, the wiring harness includes a plurality of the connectors.

Recently, since the number of the electronic equipment to be mounted on a motor vehicle is increasing, therefore as for the wiring harness described above, a plurality of subharnesses each assigned to respective functions of the electronic equipment are once constructed and then, these subharnesses are assembled into the wiring harness. That is, the number of the electronic equipment to be mounted on a motor vehicle is increasing, it causes a problem that the assembling of the subharnesses becomes complicated, the workability of the assembling is deteriorated, and the quality of the product is unstable when things come to the worst.

Therefore, in order to facilitate the assembling of the subharnesses, a connector has been used, in which crimp terminals as the terminals and insulators for holding and attaching the crimp terminals in a lined-up form are used, and the insulators are laminated so as to construct the connector. An apparatus for combining the insulators in such a connector is disclosed in Japanese Patent Application Laid-Open No. 2001-345157.

The apparatus disclosed in Japanese Patent Application Laid-Open No. 2001-345157 includes: a holding jig having holders for holding a predetermined desired insulators, said holders approaching and leaving each other; a detecting jig for detecting whether or not the predetermined desired insulators are held by the respective holders; a pressing unit for causing the holders to approach each other so as to assemble the insulators; and a control device which prevents the pressing unit from causing the holders to approach each other when the detecting jig detects that at least one holder does not hold the respective desired insulator and permits the pressing unit to cause the holders to approach each other when the detecting jig detects that all the holders hold the respective desired insulators.

Therefore, according to the apparatus disclosed in Japanese Patent Application Laid-Open No. 2001-345157, the desired insulators are attached on the respective holders and the detecting jig detects that all the holders attach the respective desired insulators and thereafter, the pressing unit causes the holders to approach each other so as to combine the insulators, thereby constructing the connector.

According to the apparatus disclosed in Japanese Patent Application Laid-Open No. 2001-345157, the detecting jig is attached to the holding jig and a switch pin of the detecting jig is turned on from turned-off, so that the detecting jig detects that the desired insulators are attached on the respective holders. Since the apparatus detects whether or not the desired insulators are attached on the respective holders by an electrical means such as turning-on and turning-off of the switch pin, therefore depending on aging such as abrasion of the detecting jig and the holding jig and on a manner of setting of the detecting jig to the holding jig, there has been a possibility that even when at least one holder holds the undesired insulator, the switch pin is turned on when the detecting jig is attached to the holding jig. That is, the apparatus has a problem that the apparatus possibly mistakenly detects whether or not the predetermined desired insulators are held by the respective holders. In other words, the apparatus has a problem that the apparatus possibly incorrectly detects whether or not the insulators are lined up in a predetermined sequence.

SUMMARY OF THE INVENTION

It is therefore an objective of the present invention to solve the above problem and to provide an insulator-combining apparatus which can correctly detects whether or not the insulators are lined up in a predetermined sequence.

In order to attain the above objective, the present invention is an insulator-combining apparatus for assembling a connector by laminating electrical insulators each hold a plurality of terminals in a lined-up form, said insulator including a wall on which the terminal is placed and an identification part which indicates order of lamination upon the assembling of the connector, the apparatus including:

a plurality of holders which approach and leave each other, attach the insulators thereon on a condition that the walls are spaced from each other, and each include first corresponding parts corresponding to the identification parts of the corresponding insulators;

a combining part which causes the holders to approach each other and laminates the insulators; and an erroneous attaching-preventing means which permits the holders to approach each other when the insulators each having the correct identification parts corresponding to the holders are attached on the holders and prevents the holders from approaching each other when at least one holder attaches the insulator having an incorrect identification part, wherein the holder includes:

a body part provided with said first corresponding part; and a nipping part, one end part of which is rotatably provided with the body part, and which nips the insulator between the body part and the nipping part when the insulator having a correct identification part corresponding to the first corresponding part is attached on the body part, wherein the erroneous attaching-preventing means includes:

a sliding member which is provided slidably in a direction crossing at right angles a direction in which the holders approach each other between (A) an allowed position where the sliding member is placed on an opposite end part of the nipping part and permits the combining part to cause the holders to approach each other and (B) a detachable position where the insulator is attachable on or detachable from the holder, and interferes with the nipping part of the holder, on which an incorrect insulator is attached, so as to be prevented from being positioned at the allowed position; and restricting means which are provided on both the combining part and the sliding member, and interfere with each other so as to prevent the combining part from causing the holders to approach each other when the sliding member is positioned nearer to the detachable position than the allowed position.

With the construction described above, since the restricting means are provided on both of the combining part and the sliding member so that the restricting means interfere with each other unless the sliding member is positioned at the allowed position, that is, when an incorrect insulator is attached on the holder, therefore even if there is aging or a change in a way of setting of the insulators on the holders, when an incorrect insulator is attached on at least one holder, the restricting means securely interfere with each other so as to prevent the holders from approaching each other. Therefore, by knowing whether or not the holders approach each other, it can be correctly known whether or not the desired (i.e. correct) insulators are attached on the holders, that is, it can be correctly known whether or not the insulators are lined up according to a predetermined order.

The combining part includes a pair of nipping members which position a plurality of the holders therebetween and approach each other so as to cause the holders to approach each other, wherein the restricting means includes:

a projection which projects from one of the nipping member and the sliding member; and an interfering protrusion which is provided on another of the nipping member and the sliding member and is lined up with the projection along a direction in which the holders approach each other when the sliding member is positioned nearer to the detachable position than the allowed position, and is spaced from the projection along a direction crossing at right angles a direction in which the holders approach each other when the sliding member is positioned at the allowed position.

With the construction described above, the projection and the interfering protrusion securely interfere with each other when the sliding member is positioned nearer to the detachable position than the allowed position, that is, when an incorrect insulator is attached on the holder. Therefore, by knowing whether or not the holders approach each other, it can be correctly known whether or not the desired (i.e. correct) insulators are attached on the holders, that is, it can be correctly known whether or not the insulators are lined up according to a predetermined order.

The insulator-combining apparatus further includes an attaching jig which attaches collectively the insulators on the holders, wherein the attaching jig includes:

a jig body; and rising-up pieces arranged being spaced from each other, said rising-up piece rising up from the jig body and being capable of entering into between the holders adjacent to each other, wherein the insulator is held by being nipped in between the rising-up pieces adjacent to each other and the rising-up pieces are inserted in between the respective holders, so that the insulators are attached on the respective holders.

With the construction described above, a plurality of the insulators can be attached on the corresponding holders at the same time. Therefore, a time required to attach the insulators on the holders can be shortened and therefore, a time required to assemble the connector can be shortened.

The insulator-combining apparatus further includes a provisional placing jig which detachably attaches the attaching jig and to which the insulator is attached on a condition that the attaching jig is attached to the provisional placing jig, wherein the provisional placing jig includes:

a provisional placing jig body which is capable of attaching the attaching jig;

an entering piece which is capable of entering in between the rising-up pieces adjacent to each other of the attaching jig attached to the provisional placing jig body, the identification part of the insulator being placed on an end surface of the entering piece; and a second corresponding part which is provided on the end surface of the entering piece and corresponds to the identification part of the corresponding insulator.

With the construction described above, since it can be easily known whether or not the desired (i.e. correct) insulators are nipped in between the rising-up pieces adjacent to each other of the attaching jig, therefore it can be easily known whether or not the insulators are lined up according to a predetermined order. Further, since the provisional placing jig and the attaching jig are separated from each other, therefore if the provisional placing jig and the attaching jig both having a simple structure are arranged on a wiring plate and the holders and the combining apparatus having a complicated structure are arranged on a transfer path of the wiring plate, the insulators attached on a plurality of the wiring plates can be securely combined with each other by providing only one holder and one combining apparatus each of which has a complicated structure and is costly.

DESCRIPTION OF THE PREFERRED EMBODIMENTS

In the following, a plate-combining apparatus 1 as an insulator-combining apparatus according to a preferred embodiment of the present invention will be explained with reference to FIGS. 1-28. The plate-combining apparatus 1 laminates a plurality of electrically insulating plates 3 as the electrical insulators, to which crimp terminals 2 as the terminals are attached, so as to assemble a connector 4 shown in FIG. 28.

Figure 28:
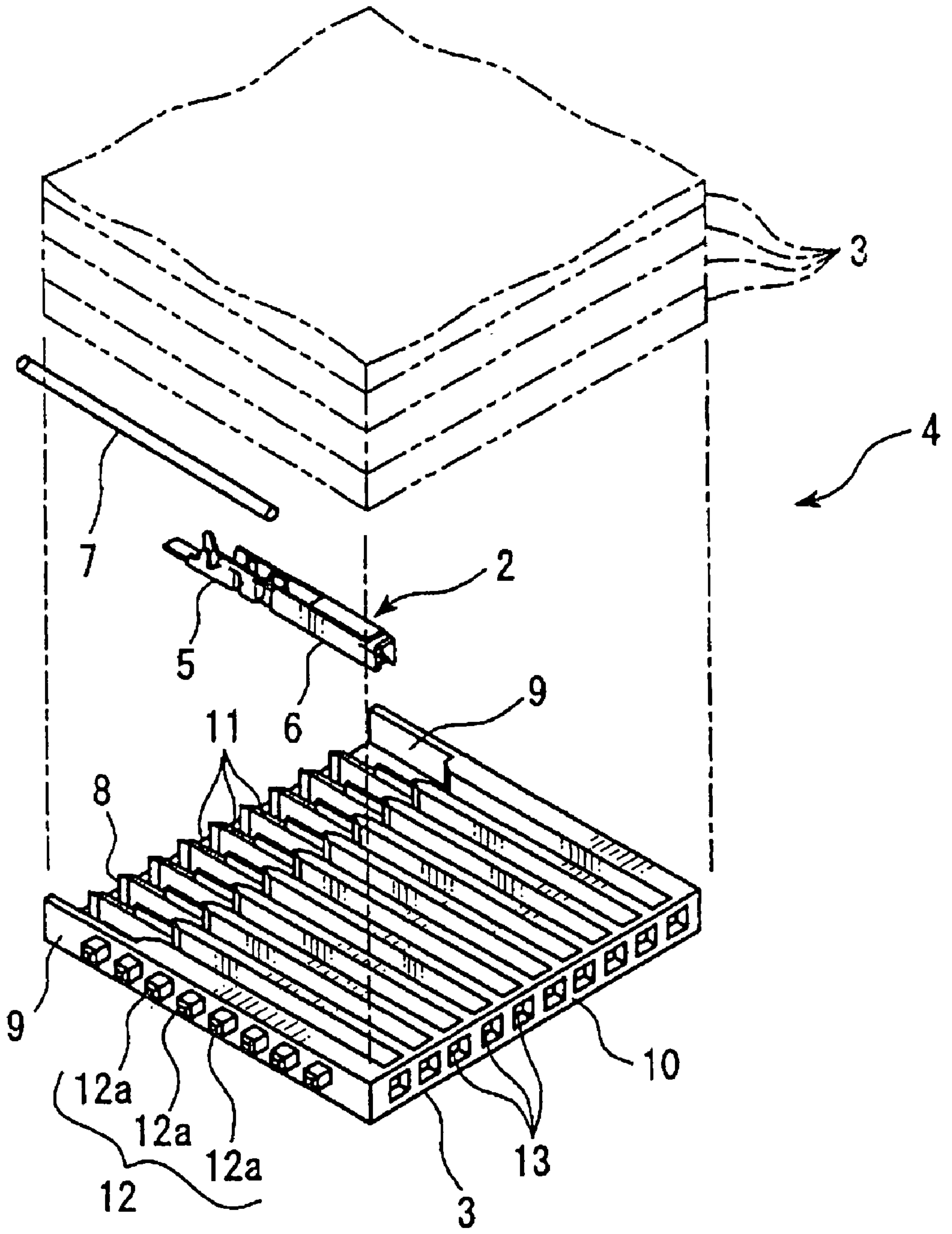
FIG. 28 is a perspective view illustrating a connector to be assembled by using the plate-combining apparatus shown in FIG. 1.

The crimp terminal 2 is formed by bending an electrically conductive sheet metal. As shown in FIG. 28, the crimp terminal 2 integrally includes an electric wire connecting part 5 and an electric contact part 6.

The electric wire connecting part 5 caulks an end of an electric wire 7 so as to be connected to a core wire of the electric wire 7. The electric wire connecting part 5 attaches the electric wire 7 by crimping to the electric wire 7. The electric contact part 6 is formed in a tube-shape and connected to a tab of a mating terminal fitting which tab enters inside the electric contact part 6.

The crimp terminal 2 is press-fit into a terminal-receiving groove 14 of the insulating plate 3, so that the crimp terminal 2 is received in and held by the insulating plate 3.

The insulating plate 3 is made of electrically insulating resin and so on and includes a bottom wall 8 as a wall, a pair of side walls 9, an edge wall 10, a plurality of partition walls 11 each rising up from the bottom wall 8, and identification part 12 as shown in FIG. 28.

The bottom wall 8 is formed in a rectangular shape in its plan view. The bottom wall 8 is formed approximately flat. The side walls 9 face each other being arranged in parallel with each other. Each side wall 9 rises up from an outer edge of the bottom wall 8.

The edge wall 10 continues to both of the bottom wall 8 and the pair of the side walls 9. The edge wall 10 rises up from an outer edge of the bottom wall 8. The edge wall is provided with a plurality of through holes through which the tab of the mating terminal fitting passes. The partition walls 11 are arranged in parallel with each other being spaced from each other. The partition wall 11 is arranged between and in parallel with the pair of the side walls 9.

The identification part 12 is provided on one side wall 9 and includes a plurality of projections 12*a*. Each projection 12*a* projects from an outer surface of one side wall 9 toward the outside. The projections 12*a* are lined up along the longitudinal direction of the partition walls 11, that is, along the longitudinal direction of a terminal-receiving groove 14 (explained later). The projection 12*a* is formed in a rectangular shape in its plan view. In an example shown in the figure, eight projections 12*a* are provided.

The identification part 12 indicates an article number of the insulating plate 3 when a plurality of the projections 12*a* lined up with each other are removed from one side wall 9 so as to be flush with an outer surface of the side wall 9 or maintained their projecting condition from the side wall 9. The identification part 12 indicates an article number of the insulating plate 3 with existence or non-existence of unevenness of the projection 12*a*. The identification part 12 indicates an order, in which the insulating plates 3 are laminated to assemble the connector 4, as the article number of the insulating plate 3.

The insulating plate 3 receives the crimp terminal 2 in between the partition walls 11 adjacent to each other and the bottom wall 8. A space surrounded by the partition walls 11 adjacent to each other and the bottom wall 8 defines a terminal-receiving groove 14. A plurality of the terminal-receiving grooves 14 are lined up with each other. The terminal-receiving groove 14 receives the crimp terminal 2, so that the insulating plate 3 places the crimp terminal 2 on the bottom wall 8.

The insulating plate 3 receives the crimp terminal 2 in a terminal-receiving groove 14 which is selected arbitrarily from a plurality of the terminal-receiving grooves 14. The bottom walls 8 are laminated into a condition that the bottom walls 8 are arranged in parallel with each other being spaced from each other, so that the insulating plates 3 construct the connector 4 on a condition that the insulating plates 3 receive the respective crimp terminals 2. Further, the insulating plates 3 include respective engaging parts, by which the insulating plates 3 fix to each other when the insulating plates 3 are laminated one upon another.

Figure 1:
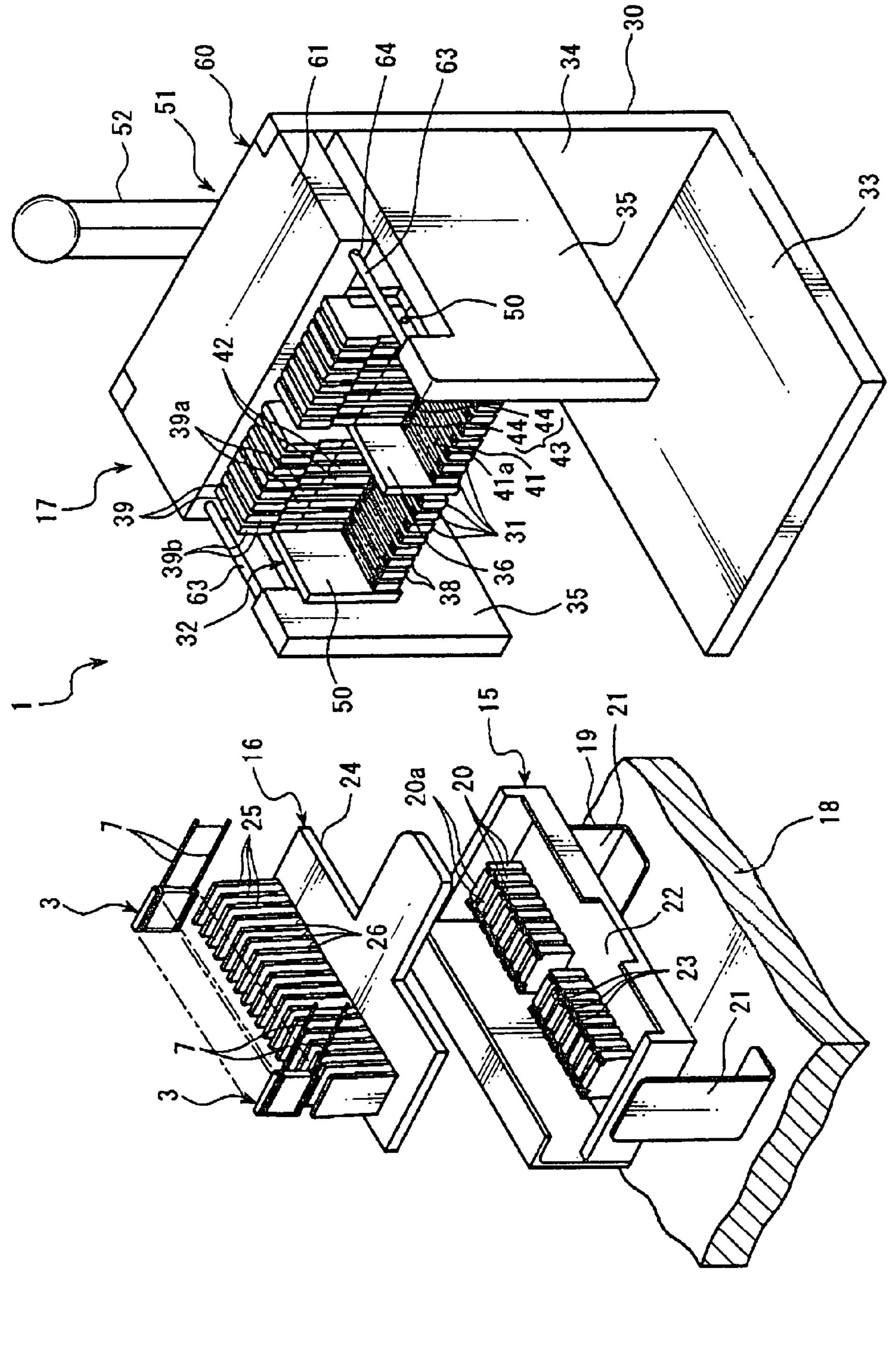
FIG. 1 is a perspective view illustrating a construction of a plate-combining apparatus according to a preferred embodiment of the present invention.

As shown in FIG. 1, the plate-combining apparatus 1 includes a provisional placing jig 15, attaching jig 16, and plate-setting jig 17.

As shown in FIG. 1, the provisional placing jig 15 is placed on a wiring plate 18, on which subharnesses constructing a wiring harness are wired in order when the wiring harness is assembled. A plurality of the wiring plates 18 are defined as a unit and run on a floor in a plant, so that the subharnesses are wired in order. Thus, the provisional placing jig 15 is placed on the wiring plate 18 which is used when the wiring harness is assembled.

As shown in FIG. 1, the provisional placing jig 15 includes a provisional placing jig body 19 and a plurality of entering pieces 20. The provisional placing jig body 19 is formed in a table-shape and includes a pair of leg parts 21 rising-up from the wiring plate 18, a ceiling plate 22 which connects upper end parts of the leg parts 21 and so on. When a jig body 24

(explained later) of the attaching jig 16 is placed on the ceiling plate 22, the provisional placing jig body 19 attaches the attaching jig 16. The jig body 24 of the attaching jig 16 is attachable on or detachable from the provisional placing jig body 19.

Each entering piece 20 is formed in a rectangular plate-shape in its plan view and rises up from the ceiling plate 22 of the provisional placing jig body 19. A plurality of the entering pieces 20 are arranged in parallel with each other being spaced from each other. A pitch of the entering piece 20 (that is, a distance between center lines dividing the thickness of the entering piece 20 into two equal parts) is equal to a pitch between the holders 31 (explained later) being spaced from each other of the plate-setting jig 17 (that is, a distance between center lines dividing the thickness of the holder 31 into two equal parts).

When the jig body 24 of the attaching jig 16 is placed and attached on the ceiling plate 22 of the provisional placing jig body 19, the entering piece 20 enters in between raising-up pieces 25 (explained later) of the attaching jig 16. Then, the insulating plate 3 inserted in between the raising-up pieces 25 is placed on an end surface 20*a* of the entering piece 20, said end surface 20*a* being situated farthest from the ceiling plate 22.

Further, the end surface 20*a* of the entering piece 20 being situated farthest from the ceiling plate 22 is provided with a notch part 23 as the second corresponding part. The notch part 23 is formed concave from the end surface 20*a* of the entering piece 20. The projection 12*a* enters the inside of the notch part 23. When the projection 12*a* enters the inside of the notch part 23, one side wall 9 of the insulating plate 3 is placed on the end surface 20*a* of the entering piece 20.

The notch parts 23 are formed at different positions depending upon the respective entering pieces 20. Each notch part 23 is formed at a position which coincides with the projection 12*a* of the identification part 12 of the insulating plate 3, which is placed on the end surface 20*a* of the entering piece 20 according to an order, in which the insulating plates 3 are laminated when the connector 4 is assembled.

That is, the projection 12*a* of the insulating plate 3, which correctly corresponds to the order of the laminating upon assembling the connector 4, enters the inside of the notch part 23. Then, the notch part 23 permits the side wall 9 to be placed on the end surface 20*a* of the entering piece 20. The notch part 23 corresponds to the identification part 12 of the insulating plate 3 corresponding to the order in which the insulating plates 3 are laminated when the connector 4 is assembled.

At least a part of the projection 12*a* of an incorrect insulating plate 3, which does not correspond to the order in which the insulating plates 3 are laminated when the connector 4 is assembled, abuts against the end surface 20*a* of the entering piece 20, so that the notch part 23 prevents the side wall 9 and the end surface 20*a* from being placed one upon another and causes the side wall 9 and the end surface 20*a* to face each other having a distance therebetween. The notch part 23 causes the projection 12*a* of an incorrect insulating plate 3, which does not correspond to the order in which the insulating plates 3 are laminated when the connector 4 is assembled, to abut against the end surface 20*a*, so that the notch part 23 indicates whether or not a correct insulating plate 3 is arranged on the end surface 20*a* of the entering piece 20.

Figure 2:
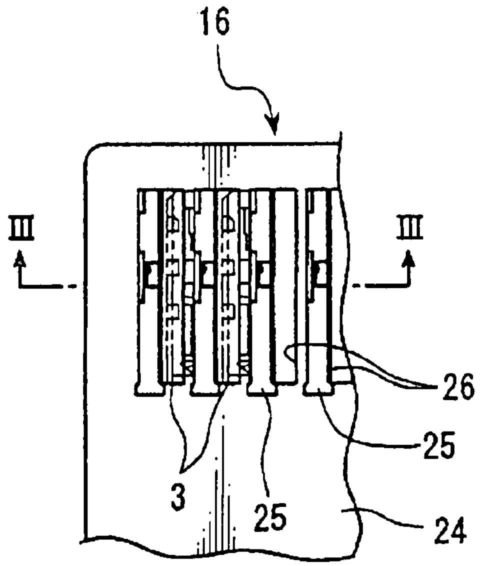
FIG. 2 is a plan view illustrating an exploded primary part of an attaching jig of the plate-combining apparatus shown in FIG. 1.
Figure 3:
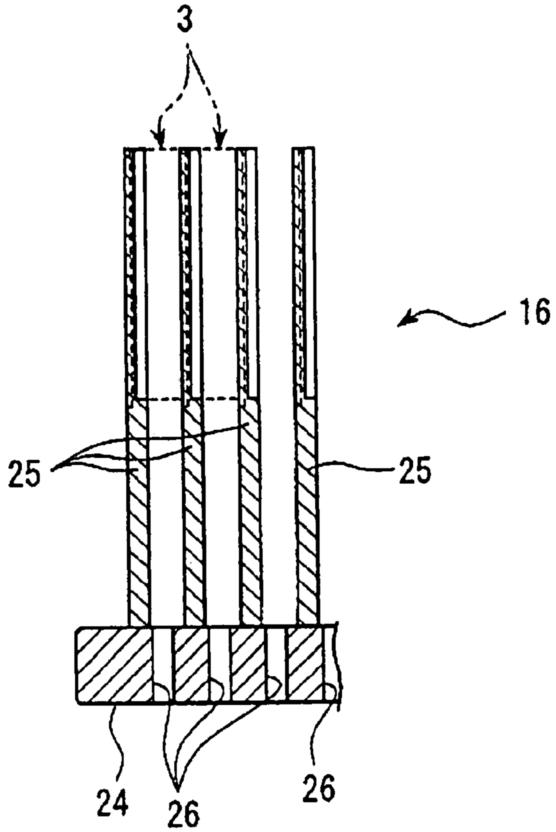
FIG. 3 is a cross sectional view taken along III-III line in FIG. 2.

As shown in FIGS. 1-3, the attaching jig 16 includes a jig body 24, a plurality of rising-up pieces 25 and a plurality of entering piece-passing holes 26. The jig body 24 is formed in a flat plate-shape.

Each rising-up piece 25 is formed in a rectangular plate-shape in its plan view and rises up from the jig body 24. A plurality of rising-up pieces 25 are arranged in parallel with each other having a distance therebetween. A thickness of the rising-up piece 25 is approximately the same as a distance between the holders 31 adjacent to each other. The rising-up piece 25 can enter into between the holders 31 adjacent to each other. The insulating plate 3 is nipped between the rising-up pieces 25 adjacent to each other.

As shown in FIG. 3, the entering piece-passing holes 26 penetrates through the jig body 24 and arranged between the rising-up pieces 25 adjacent to each other. The entering piece-passing hole 26 lets the entering piece 20 pass therethrough.

The entering piece-passing holes 26 let the respective entering pieces 20 pass therethrough and the jig body 24 is placed on the ceiling plate 22, so that the attaching jig 16 is attached on the provisional placing jig 15. Then, the insulating plate 3 having a desired article number (i.e. a correct order) is inserted into between the rising-up pieces 25 in the attaching jig 16. The insulating plates 3 are nipped between the respective rising-up pieces 25 adjacent to each other, so that the attaching jig 16 holds the insulating plates 3.

The attaching jig 16 is removed from the provisional placing jig 15 on a condition that the attaching jig 16 holds the insulating plates 3. Thereafter, the rising-up piece 25 is inserted in between the holders 31, so that the attaching jig 16 is attached on the plate-setting jig 17. When the rising-up pieces 25 are inserted in the respective holders 31, the attaching jig 16 attaches the insulating plates 3 on the respective holders 31 nipped between the respective rising-up pieces 25.

Only one plate-setting jig 17 is provided at a predetermined position in a wiring harness-assembling line, which is constructed with a plurality of the wiring plates 18. As shown in FIGS. 1 and 4-6, the plate-setting jig 17 includes a frame 30, a plurality of the holders 31, combining part 32, and erroneous attaching-preventing part 30 as the erroneous attaching-preventing means.

The frame 30 includes a flat plate-shaped base plate 33 to be placed on a table and the like, a flat plate-shaped rising-up plate 34 rising up from the base plate 33, a pair of side plates 35, partition plate 36, and a plurality of shafts 37. The side plates 35 each are formed in a flat plate-shape and rise up from both edges of the rising-up plate 34. Both surfaces of the side plate 35 are arranged along a vertical direction. The side plates 35 are arranged in parallel with each other having a distance therebetween.

The partition plate 36 is formed in a flat plate-shape. Both surfaces of the partition plate 36 are arranged along a vertical direction. The partition plate 36 rises up from the rising-up plate 34 and is arranged at the center between the pair of the side plates 35. Each shaft 37 is formed in a tube-shaped bar and penetrates through the partition plate 36. Both ends of the shaft 37 are fixed to the pair of the side plates 35. A plurality of the shafts 37 are arranged in parallel with each other along the horizontal direction. The base plate 33, rising-up plate 34, pair of the side plates 35, partition plate 36 and shafts 37 are fixed to one another.

The holders 31 are arranged in parallel with each other being spaced from each other. The holder 31 is arranged between the side plate 35 and the partition plate 36. In an example shown in the figure, eight holders 31 are provided between the respective side plates 35 and the partition plates 36. Each holder 31 holds one insulating plate 3.

As shown in FIG. 3, each holder 31 includes a body part 38, a lever member 39 as the nipping part, a leaf spring 40 and so on. The body part 38 includes a supporting piece 41 as the supporting part, rising-up piece 42, and corresponding part 43.

The supporting piece 43 is formed in a band plate-shape. Both surfaces of the supporting piece 43 are arranged along a surface of the pair of the side plates 35. An upper end surface 41*a* of the supporting piece 41 situated away from the base plate 33 crosses at right angles both surfaces of the rising-up piece 42 and is arranged in parallel with the horizontal direction. The rising-up piece 42 is formed in a band plate-shape. The rising-up piece 42 rises up upward (i.e. toward the direction leaving the base plate 33) from an end of the supporting piece 41 near the rising-up plate 34 in the longitudinal direction. The body part 38 is formed in a L-shape with the supporting piece 41 and the rising-up piece 42 which continues to the end of the supporting piece 41.

The corresponding part 43 includes one recess 44 or more recesses 44 formed concave from an upper end surface 41*a* of the supporting piece 41. The projection 12*a* enters the inside of the recess 44. When the projection 12*a* enters the inside of the recess 44, the upper end surface 41*a* and the side wall 9 are placed one upon another.

The one recess 44 is or more recesses 44 are formed at a different position depending on the holder 31. The recess 44 is formed at a position which coincides with the projection 12*a* of the identification part 12 of the insulating plate 3 to be held by the holder 31 according to the order in which the insulating plates 3 are laminated when the connector 4 is assembled.

That is, the recess 44 receives the projection 12*a* of the insulating plate 3 which corresponds to the order in which the insulating plates 3 are laminated when the connector 4 is assembled. The recess 44 permits the side wall 9 to be placed on the upper end surface 41*a* of the supporting piece 41. The recess 44 corresponds to identification part 12 of the insulating plate 3 which corresponds to the order in which the insulating plates 3 are laminated when the connector 4 is assembled.

At least a part of the projection 12*a* of an incorrect insulating plate 3, which does not correspond to the order in which the insulating plates 3 are laminated when the connector 4 is assembled, abuts against the upper end surface 41*a* of the supporting piece 41, so that the recess 44 prevents the side wall 9 and the end surface 41*a* from being placed one upon another and causes the side wall 9 and the end surface 41*a* to face each other having a distance therebetween. The recess 44 causes the projection 12*a* of an incorrect insulating plate 3, which does not correspond to the order in which the insulating plates 3 are laminated when the connector 4 is assembled, to abut against the upper end surface 41*a*, so that the recess 44 indicates whether or not a correct insulating plate 3 is attached on the holder 31.

With the construction described above, the corresponding part 43 causes the holders 31 to hold the respective correct insulating plates 3 in accordance with the order in which the insulating plates 3 are laminated when the connector 4 is assembled.

In an example in the figure, the body part 38 is constructed with three plates which are placed and put one upon another. Each plate constructing the body part 38 integrally includes a part which corresponds to the supporting piece 41 and the rising-up piece 42. The plate situated at the center of the three plates is provided with the recess 44.

The lever member 39 is formed in an arm-shape extending straight. An end part 39*a* of the lever member 39 is nipped between the plates of both ends located at the upper end part of the rising-up piece 25 of the body part 38 and supported rotatably around a shaft 45 attached to the upper end part of the rising-up piece 25. The end part 39*a* is provided with a notch 46 for rising-up and a notch 47 for nipping. These notches 46 and 47 are formed concave from an outer edge of the lever member 39.

The lever member 39 rotates around the shaft 45 and is displaced between a condition (shown by a solid line in FIG. 7), in which the lever member 39 is parallel with the rising-up piece 25, and a condition (shown by an alternate long and two short dashes line in FIG. 7), in which the lever member 39 is parallel with the supporting piece 41 and is capable of nipping the insulating plate 3 between the lever member 39 and the supporting piece 41.

Figure 8:
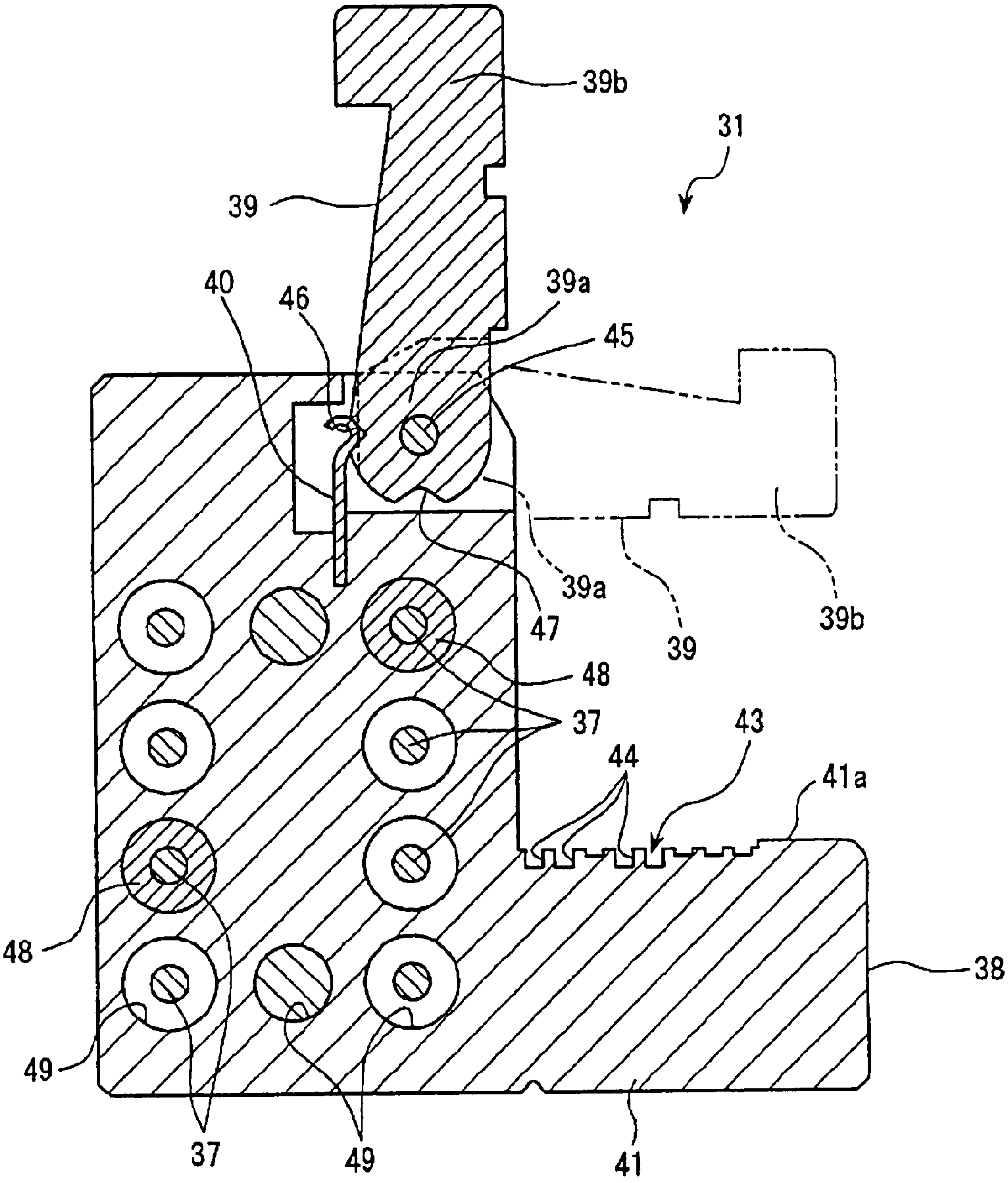
FIG. 8 is a cross sectional view taken along VIII-VIII line in FIG. 5.

As shown in FIG. 8, the leaf spring 40 is formed in a belt plate-shape. One end of the leaf spring 40 is fixed to the rising-up piece 25 of the body part 38 of the holder 31, while an opposite end of the leaf spring 40 abuts against the end part 39*a* of the lever member 39. The leaf spring 40 generates resilient restoring force which presses the end part 39*a* of the lever member 39. When the opposite end of the leaf spring 40 enters inside the notches 46, 47, the leaf spring 40 maintains a posture of the lever member 39 in a condition shown by a solid line in FIG. 7 or a condition shown by an alternate long and two short dashes line in FIG. 7. The leaf spring 40 gives a feeling of click when the lever member 39 is displaced between a condition shown by a solid line in FIG. 7 or a condition shown by an alternate long and two short dashes line in FIG. 7.

The holder 31 positions the one side wall 9 of the insulating plate 3 on the upper end surface 41*a* of the supporting piece 41 and nips the insulating plate 3 between the supporting piece 41 and the lever member 39 so as to hold the insulating plate 3. Thus, a plurality of the holders 31 attach the insulating plates 3 on a condition that the bottom walls 8 are arranged in parallel with each other having a distance therebetween.

The holder 31 attaches a slider 48 and includes a hole 49 into which the shaft 37 is loosely inserted. The slider 48 is attached to the shaft 37 movably along the shaft 37. The slider 48 is formed in a column-shaped appearance. When the slider 48 is attached to the shaft 37, the length of the slider 48 in the longitudinal direction of the shaft 37, i.e. a direction in which the holders 31 approach and leave each other, is larger than the thickness of the holder 31.

The holder 31 is formed slidably along the longitudinal direction of the shaft 37 by means of the shaft 37 and the slider 48. The holders 31 are capable of approaching and leaving each other. A coil spring is provided between the holders 31 adjacent to each other, between the holder 31 and the partition plate 36, and between the holder 31 and a nipping member 50 (explained later). The shaft 37 passes through the coil spring. The coil spring urges the holder 31, partition plate 36 and nipping member 50 in a direction in which they leave each other and maintains their positions to have an equal distance therebetween.

Figure 6:
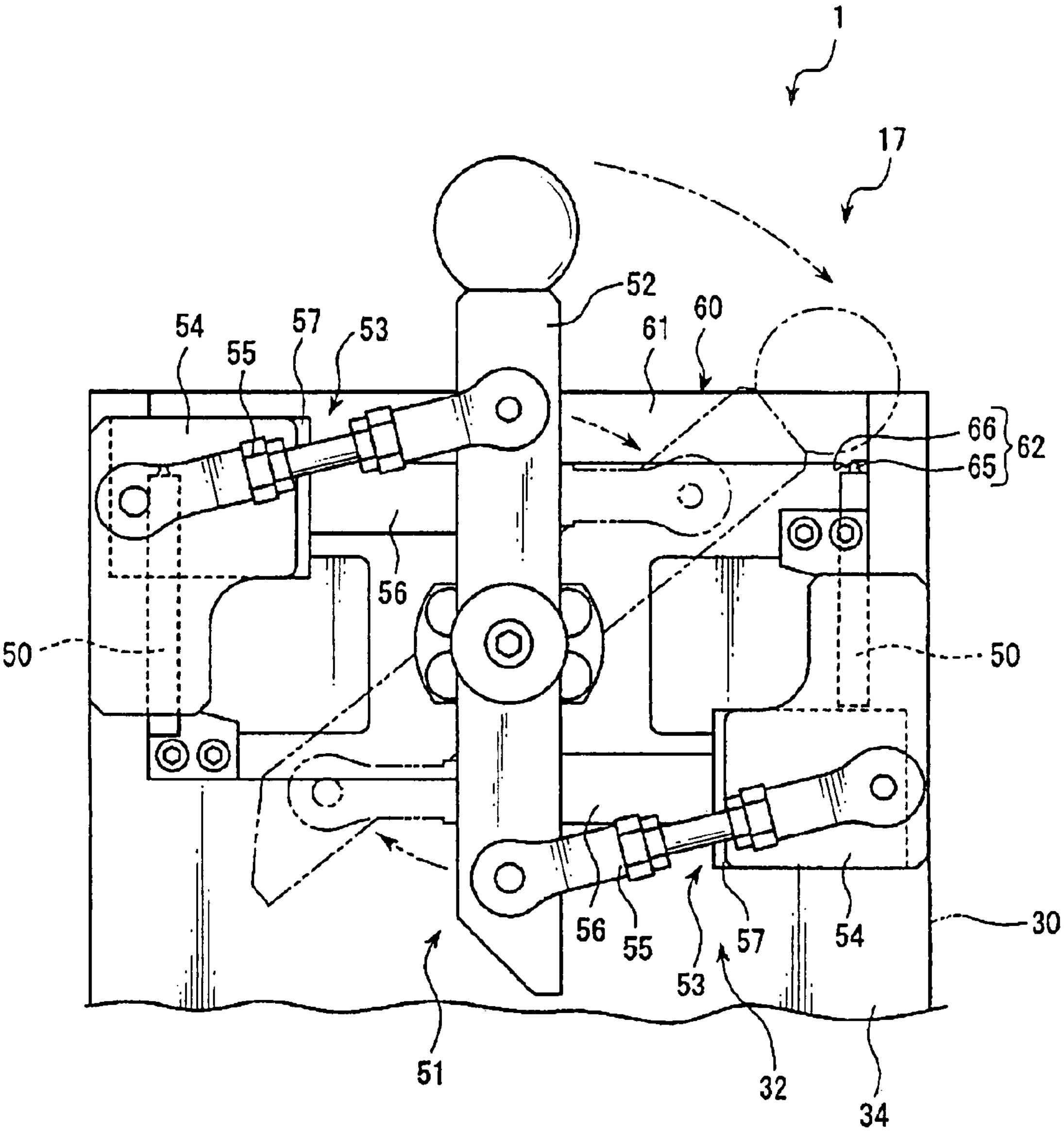
FIG. 6 is a rear view of the plate-setting jig shown in FIG. 4.
Figure 7:
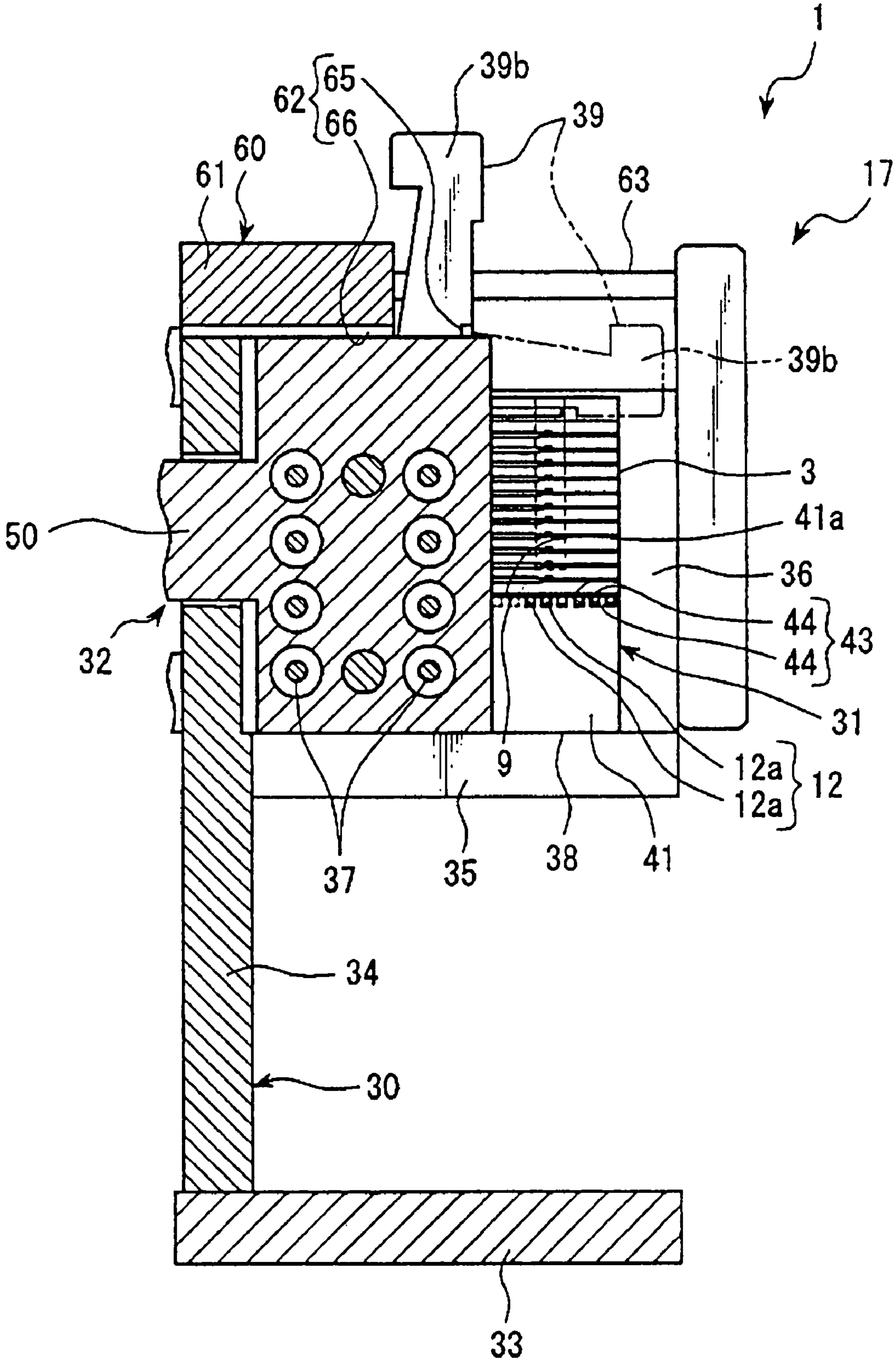
FIG. 7 is a cross sectional view taken along VII-VII line in FIG. 5.

The combining part 32 includes a pair of the nipping members 50 (shown in FIGS. 6 and 7) and an approaching-leaving drive part 51 (shown in FIG. 6). The nipping member 50 is formed in a flat plate-shape. Both surfaces of the nipping member 50 are arranged in parallel with the side plate 35. The nipping member 50 is arranged between the side plate 35 and the holder 31 which is situated nearest to the side plate 35. Thus, the pair of the nipping members 50 positions a plurality of the holders 31 therebetween. The nipping members 50 approach and leave each other by means of the approaching-leaving drive part 51. That is, the nipping members 50 approach each other by means of the approaching-leaving drive part 51 and presses the holders 31 so as to cause the holders 31 to approach each other.

As shown in FIG. 6, the approaching-leaving drive part 51 includes an operation lever 52, a pair of linear guides 53, a pair of connecting members 54, a pair of links 55. The operation lever 52 is formed in a bar-shape and its center in the longitudinal direction is rotatably supported by the center of the rising-up plate 34. The longitudinal direction of the operation lever 52 is parallel to the vertical direction.

The linear guides 53 are arranged along the horizontal direction (i.e. a direction crossing at right angles the longitudinal direction of the operation lever 52) having a distance therebetween and also arranged along the vertical direction (i.e. the longitudinal direction of the operation lever 52) having a distance therebetween. Each liner guide 53 includes a rail 56 and slider 57. The rail 56 is fixed to the rising-up plate 34. The longitudinal direction of the rail 56 is parallel to the approaching-leaving direction of the holders 31, i.e. to the longitudinal direction of the shaft 37. The slider 57 is slidably supported by the rail 56 along the longitudinal direction of the rail 56.

The connecting member 54 is fixed to the slider 57 of the linear guide 53 and to the nipping member 50. One end of the link 55 is rotatably connected to the connecting member 54, which an opposite end of the link 55 is rotatably connected to an end of the operation lever 52.

When the operation lever 52 is rotated, the approaching-leaving drive part 51 slides the slider 57 through the link 55 and the connecting member 54 so as to approach and leave the nipping members 50 each other. When the operation lever 52 is positioned at a position indicated by a solid line in FIGS. 4 and 6, the approaching-leaving drive part 51 parts the nipping members 50 farthest from each other, and when the operation lever 52 is positioned at a position indicated by an alternate long and two short dashes line in FIGS. 4 and 6, the approaching-leaving drive part 51 brings the nipping members 50 nearest close to each other.

When the operation lever 52 is rotated, the combining part 32 causes the nipping members 50 to approach and leave each other. When the combining part 32 causes the nipping members 50 to approach each other, the combining part 32 causes the holders 31 approach each other so as to combine (i.e. laminate) the insulating plates 3, which are held by the holders 31.

Figure 4:
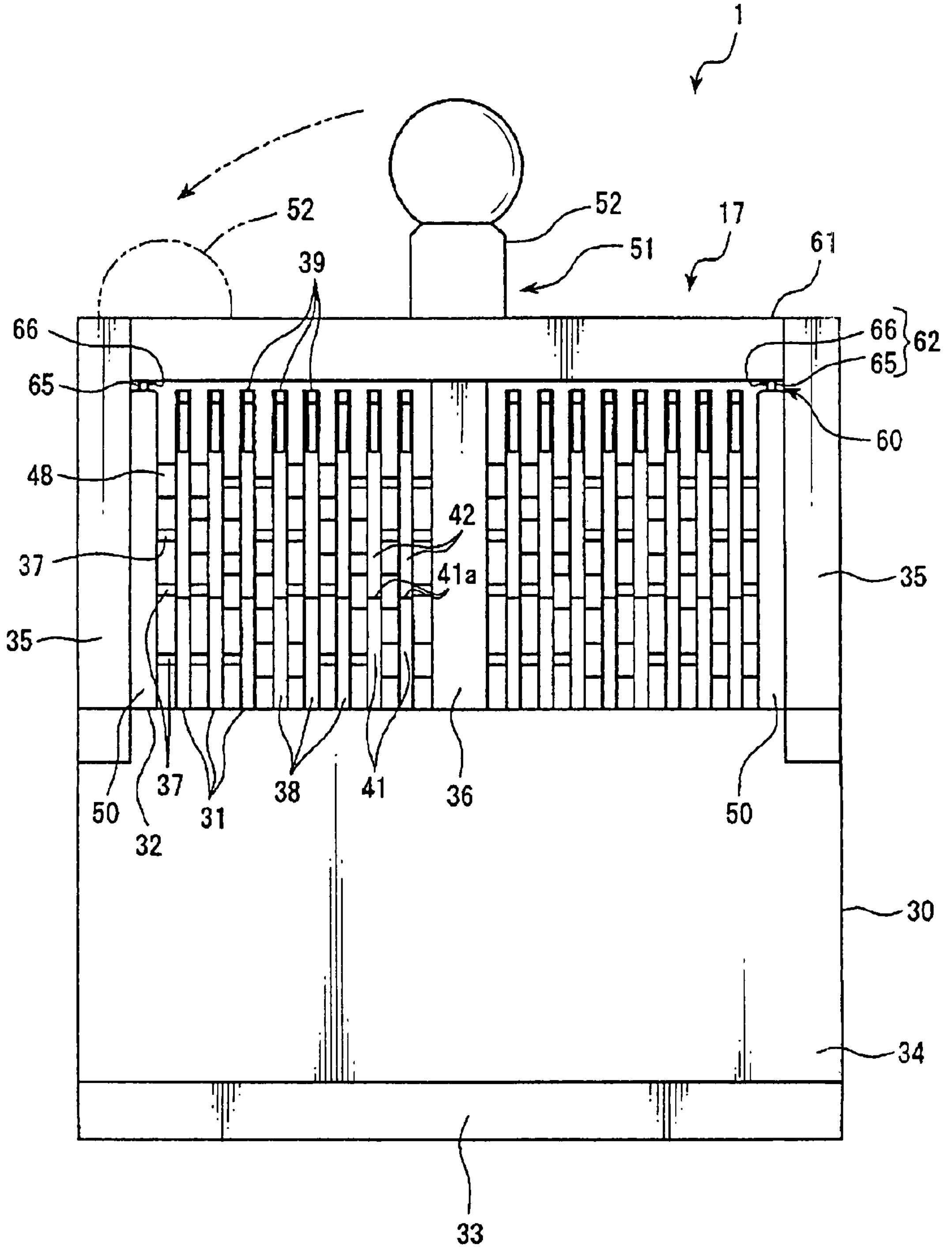
FIG. 4 is a front view of a plate-setting jig of the plate-combining apparatus shown in FIG. 1.
Figure 5:
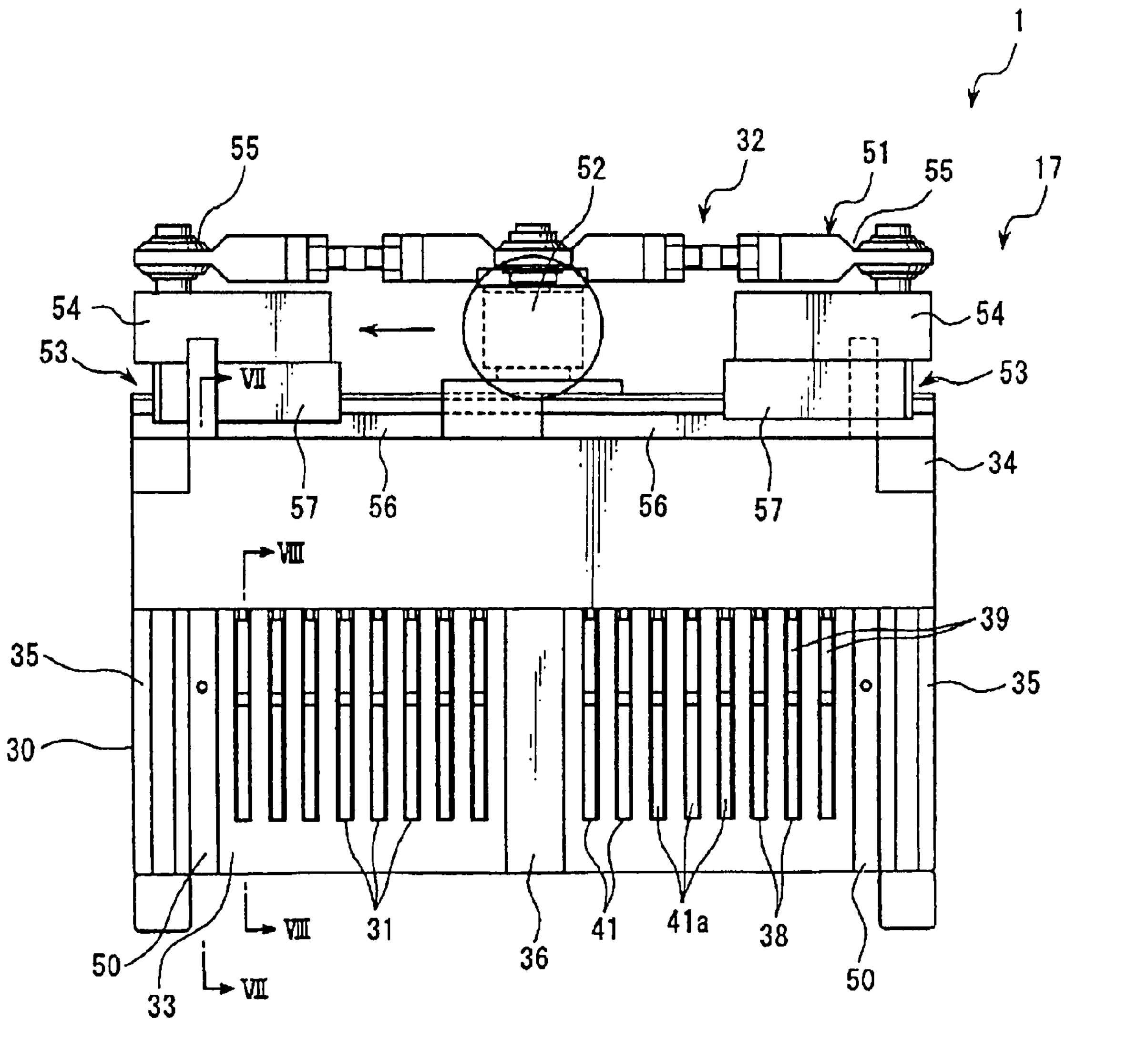
FIG. 5 is a plan view of the plate-setting jig shown in FIG. 4.
Figure 13:
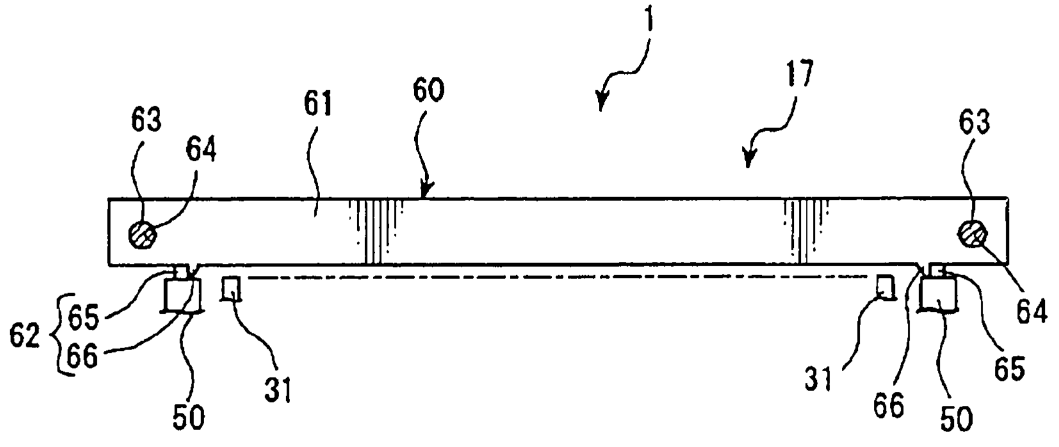
FIG. 13 is a front view illustrating a construction of the restricting means of the plate-setting jig shown in FIG. 4.

As shown in FIGS. 4 and 13, an erroneous attaching-preventing part 60 includes a sliding member 61 and a restricting part 62 as the restricting means. The sliding member 61 is formed in a thick belt plate-shape and formed slidable by a sliding bar 63 which rises up from the rising-up plate 34.

There is provided a pair of the sliding bars 63 arranged in parallel with each other having a distance therebetween. The longitudinal direction of each sliding par 63 is parallel to the horizontal direction and to both surfaces of the side plate 35. The sliding bar 63 is situated farther from the base plate 33 than the side plate 35 is.

The sliding member 61 is situated farther from the base plate 33 than the holder 31 and nipping member 50 are. The sliding member 61 is arranged near the holder 31 and nipping member 50. The sliding member 61 lets the sliding bar 63 pass through both ends thereof and is provided with a through hole 64 which is supported slidably along the longitudinal direction of the sliding bar 63.

The sliding member 61 is slidable along a direction crossing at right angles the approaching-leaving direction of the holders 31 between an allowed position (shown in FIG. 11) where the sliding member 61 is situated farthest from the rising-up plate 34 so as to be placed on the opposite end 39*b* of the lever member 39 and a detachable position where the sliding member 61 is situated nearest to the rising-up plate 34 and positioned nearer to the rising-up plate 34 than the one end 39*a* of the lever member 39 is positioned so that the lever member 39 becomes rotatable around the one end 39*a*. At the detachable position, the sliding member 61 permits the lever member 39 to rotate around the one end 39*a* so as to cause the insulating plate 3 to be detachable on the holder 31.

When at least one holder 31 attaches an incorrect insulating plate 3, the sliding member 61 interferes with the lever member 39 so as to be prevented from sliding to the allowed position. That is, when at least one holder 31 attaches an incorrect insulating plate 3, the sliding member 61 interferes with the lever member 39 so as to be positioned at a position which is near to the detachable position than the allowed position, that is, the sliding member 61 is prevented from being positioned at the allowed position.

The restricting part 62 includes a projection 65 and an interfering protrusion 66. The projection 65 is formed projecting from an upper end surface of the nipping member 50, said upper end surface facing the sliding member 61. That is, the projection 65 is formed projecting from the nipping member 50 toward the sliding member 61. The projection 65 is formed at an end of the nipping member 50, said end being situated away from the rising-up plate 34. The projection 65 is formed approximately in a cylinder-shape.

The interfering protrusion 66 is formed at both ends in the longitudinal direction of the sliding member 61. The interfering protrusion 66 is formed projecting from a lower surface of the sliding member 61, said lower surface facing the nipping member 50. That is, interfering protrusion 66 is formed projecting from the sliding member 61 toward the nipping member 50. The interfering protrusion 66 extends straight along a direction crossing at right angles a sliding direction of the sliding member 61, that is, a direction in which the holders 31 approach each other. As shown in FIGS. 4 and 13, the interfering protrusion 66 is positioned between the projections 65 provided on the pair of the nipping member 50.

When the sliding member 61 is positioned at either the detachable position or the allowed position, the projection 65 and the interfering protrusion 66 are not lined up along a direction in which the holders 31 approach each other. That is, when the sliding member 61 is positioned at either the detachable position or the allowed position, the projection 65 and the interfering protrusion 66 are spaced from each other along a direction crossing at right angles the direction in which the holders 31 approach each other. When the sliding member 61 is positioned at either the detachable position or the allowed position, the restricting part 62 permits the holders 31 to approach each other because the projection 65 and the interfering protrusion 66 are spaced from each other along the direction described above so that the projection 65 and the interfering protrusion 66 do not interfere with each other.

When the sliding member 61 is positioned at a position which is near to the allowed position and also nearer to the detachable position than the allowed position, the projection 65 and the interfering protrusion 66 are lined up along the direction in which the holders 31 approach each other. When the sliding member 61 is positioned at a position which is near to the allowed position and also nearer to the detachable position than the allowed position, the restricting part 62 prevents the holders 31 from approaching each other because the projection 65 and the interfering protrusion 66 are lined up along the direction described above so that the projection 65 and the interfering protrusion 66 interfere with each other. When the insulating plate 3 having a correct identification part 12 which corresponds to the holder 31 is attached, the erroneous attaching-preventing part 60 permits the holders 31 to approach each other. On the other hand, when at least one holder 31 attaches the insulating plate 3 having an incorrect identification part 12, the erroneous attaching-preventing part 60 prevents the holders 31 to approach each other.

Figure 17:
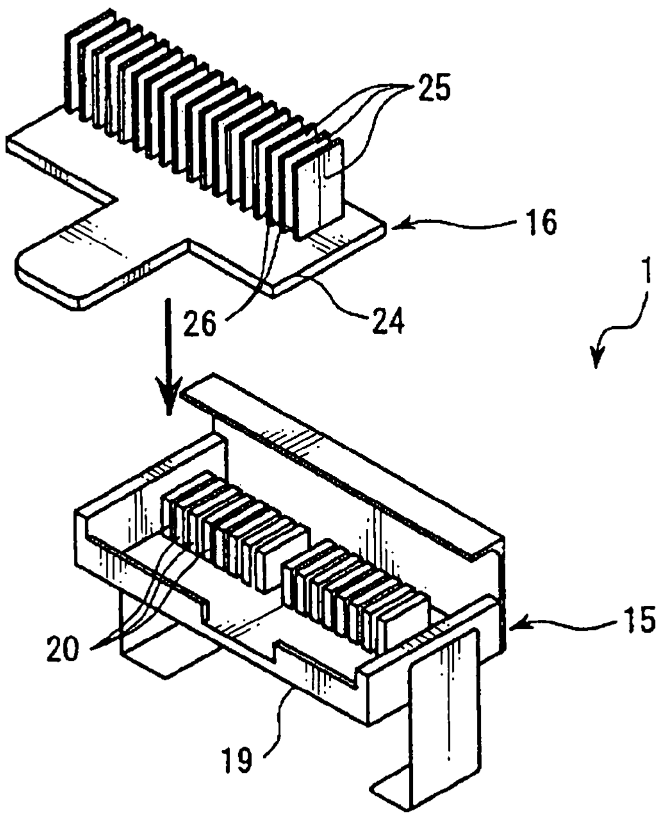
FIG. 17 is a perspective view illustrating a state when a provisional placing jig and an attaching jig of the plate-combining apparatus shown in FIG. 1 are arranged being spaced from each other.
Figure 18:
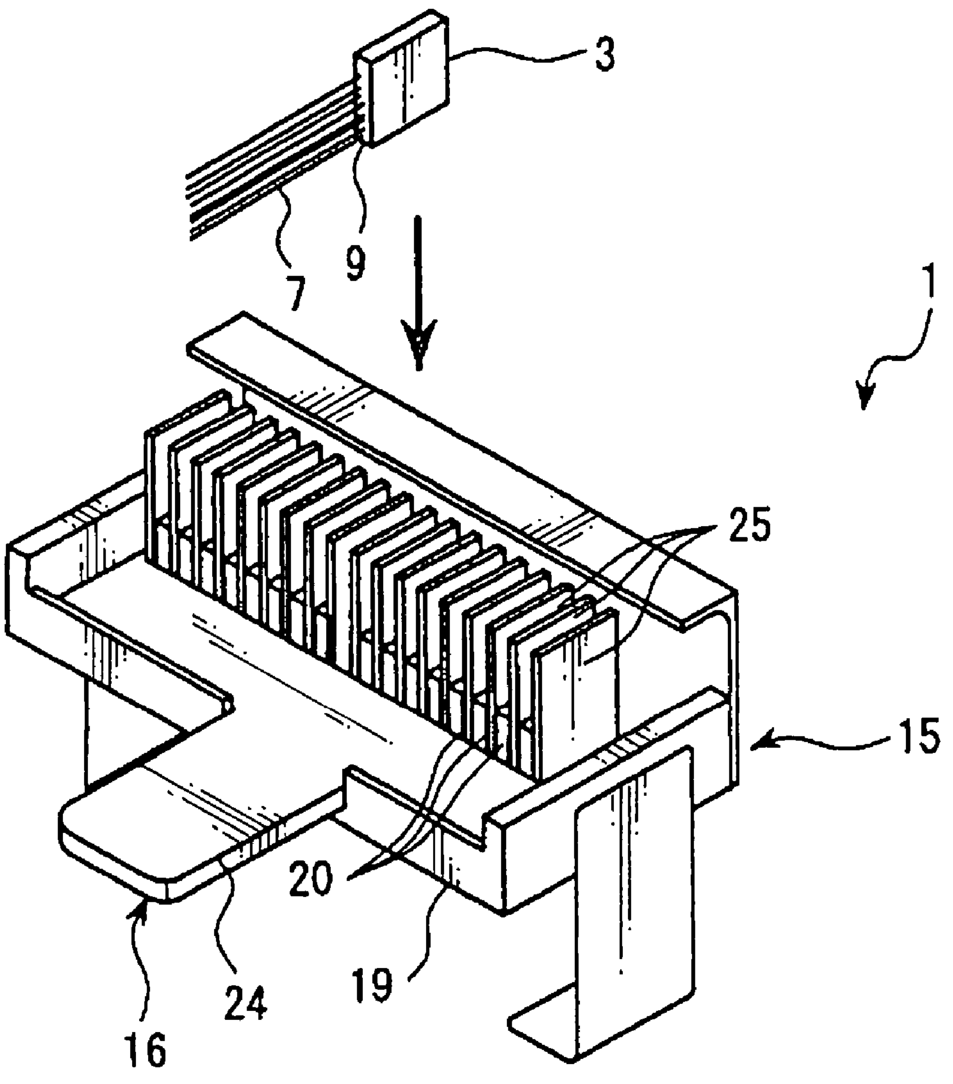
FIG. 18 is a perspective view illustrating a state when an insulating plate is attached on the attaching jig attached to the provisional placing jig shown in FIG. 17.

When the insulating plates 3 are laminated by using the plate-combining apparatus 1 to assemble the connector 4, as shown in FIG. 17, the attaching jig 16 is in advance arranged being spaced from the provisional placing jig 15 on the wiring plate 18 and thereafter, the attaching jig 16 is allowed to approach the provisional placing jig 15 from above. Then, the entering piece 20 of the provisional placing jig 15 is allowed to pass through the entering piece-passing hole 26 of the attaching jig 16 and to be inserted in between the rising-up pieces 25 adjacent to each other and as shown in FIG. 18, the attaching jig 16 is placed on the provisional placing jig 15.

Figure 9:
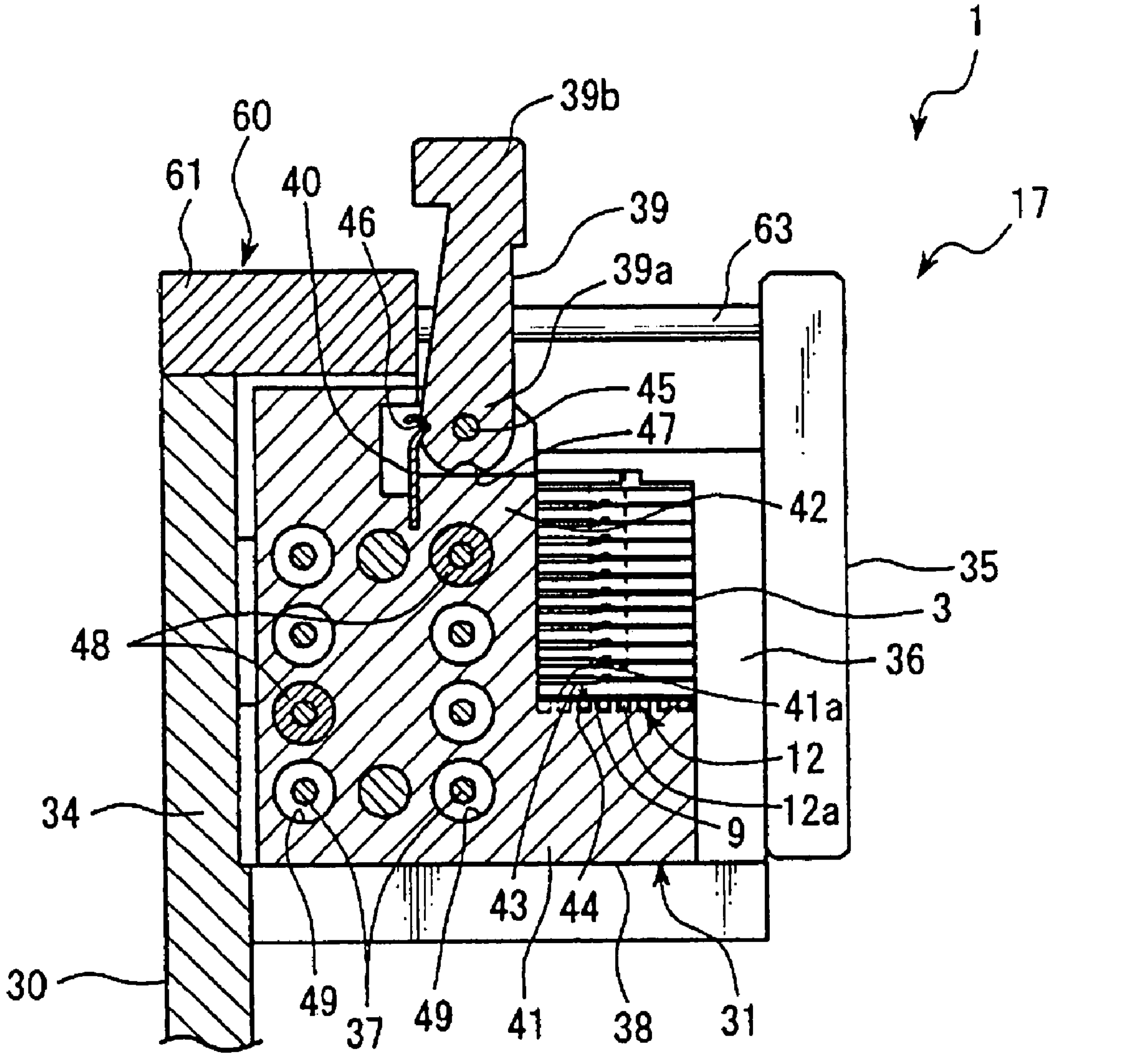
FIG. 9 is a cross sectional view illustrating a state when a correct insulating plate is attached on a holder of the plate-setting jig shown in FIG. 7.
Figure 14:
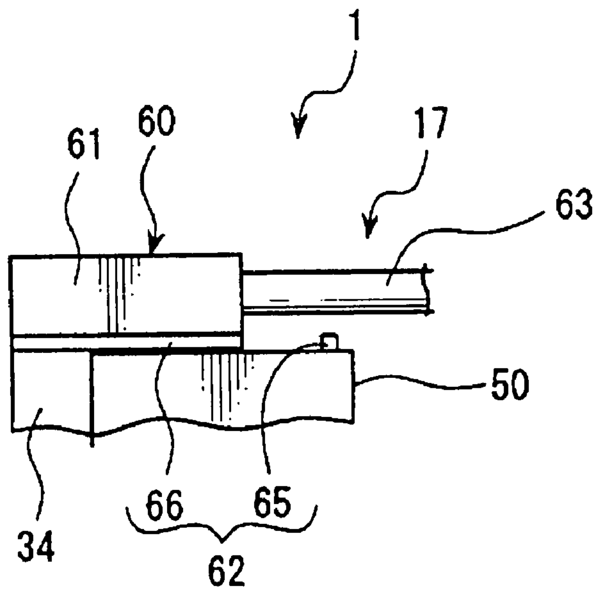
FIG. 14 is a side view illustrating a positional relationship between a projection and an interfering protrusion of the restricting means of the plate-setting jig shown in FIG. 10.
Figure 19:
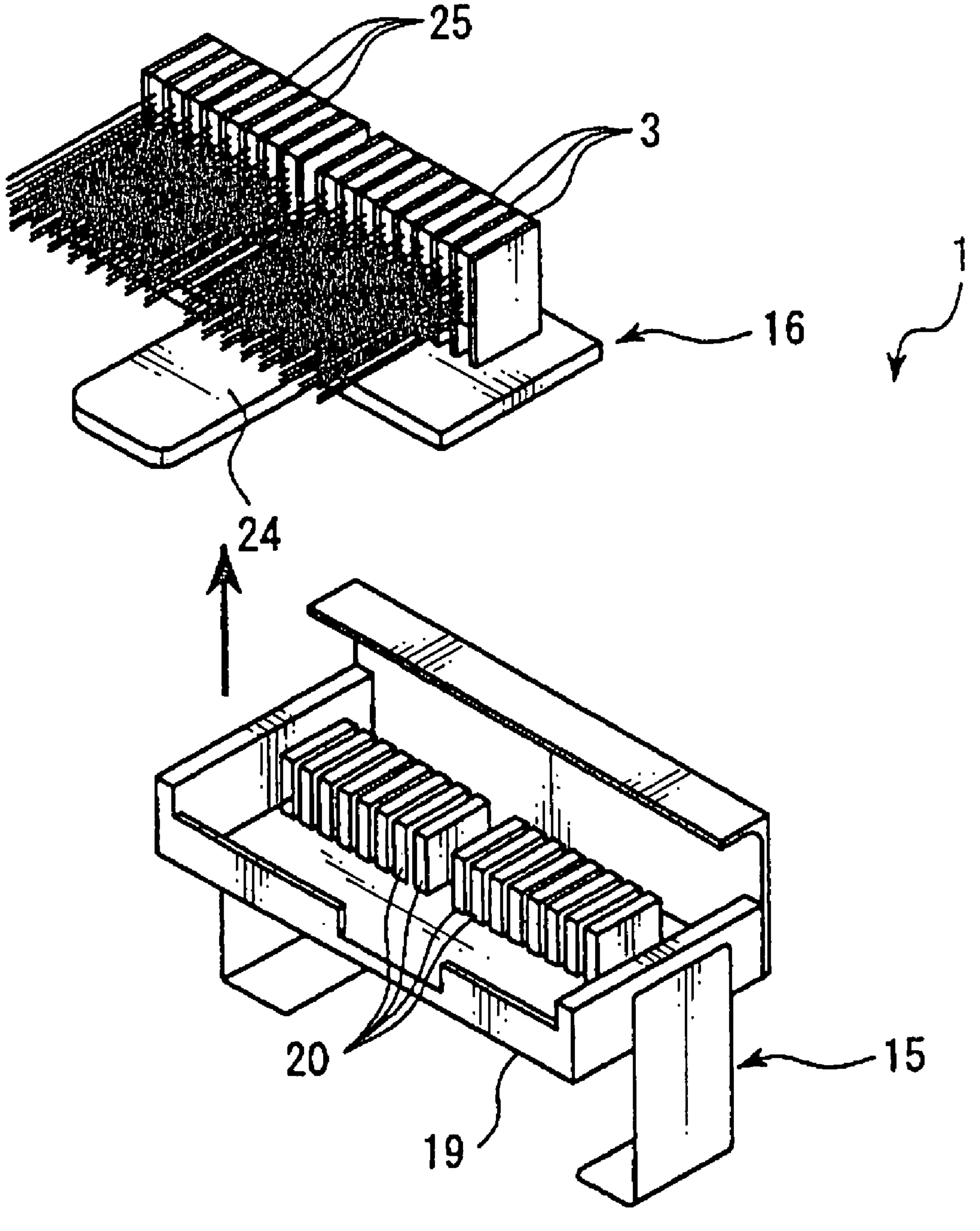
FIG. 19 is a perspective view illustrating a state when the attaching jig, to which the insulating plates shown in FIG. 18, is removed from the provisional placing jig.

When the subharnesses are assembled in turn to the wiring plate 18, the insulating plate 3 of the subharness is inserted in between the desired rising-up pieces 25 so as to attach the insulating plate 3 on the attaching jig 16. When all the insulating plates 3 are attached on the attaching jig 16, the wiring plate 18 is positioned in the proximity of the plate-setting jig 17 and as shown in FIG. 19, the attaching jig 16 is removed from the provisional placing jig 15. At that time, the holders 31 in the plate-setting jig 17 are in advance positioned farthest from each other, as shown in FIG. 9, the sliding member 61 is positioned at the detachable position and the lever member 39 of the holder 31 is positioned rising-up on the rising-up piece 25 of the holder 31. As shown in FIG. 14, the projection 65 and the interfering protrusion 66 are spaced from each other in a direction crossing at right angles the direction in which the holders 31 approach each other.

Figure 20:
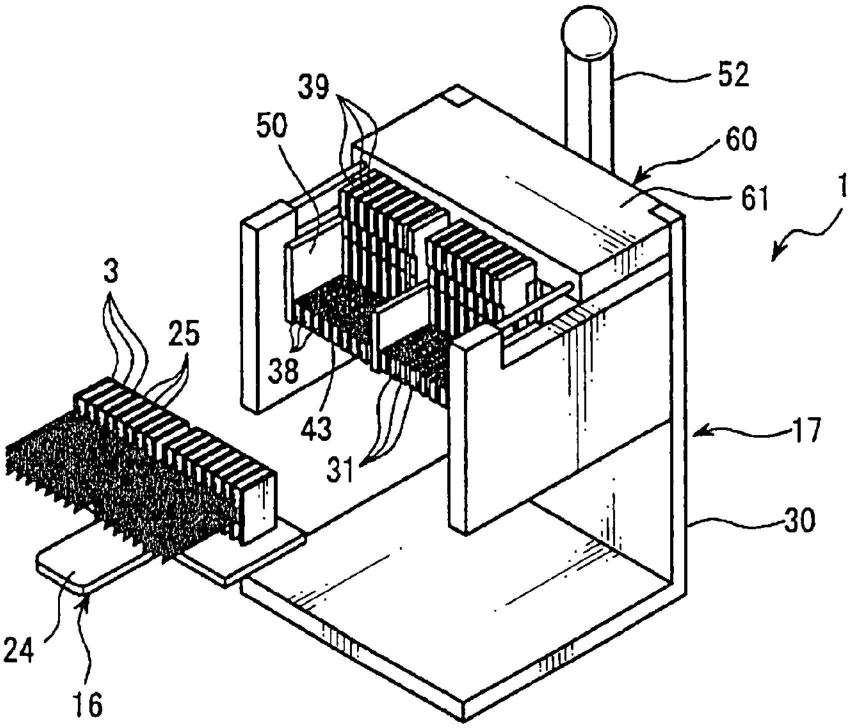
FIG. 20 is a perspective view illustrating a state when the attaching jig shown in FIG. 19 is arranged being spaced from the plate-setting jig.
Figure 21:
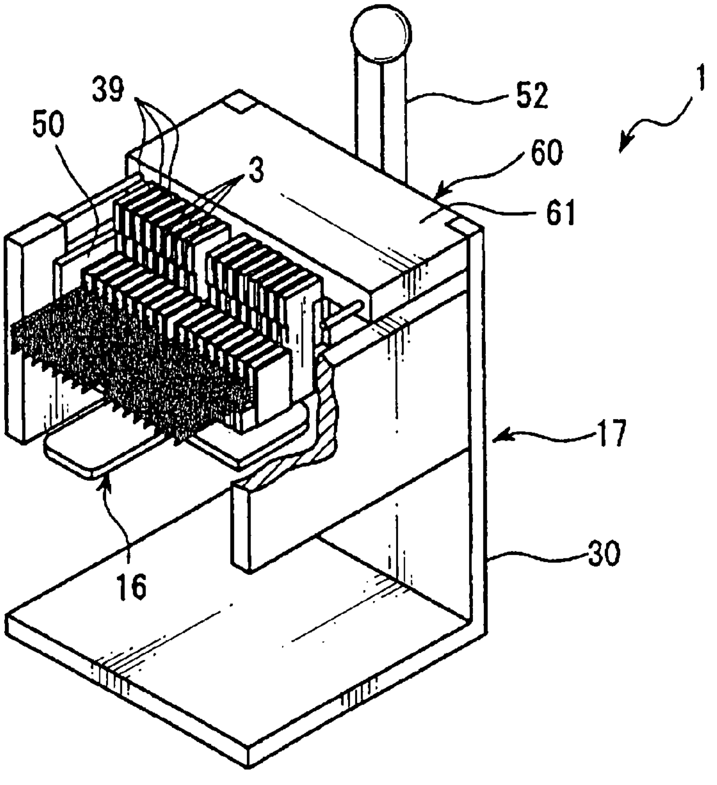
FIG. 21 is a perspective view illustrating a state when the attaching jig shown in FIG. 20 is attached to the plate-setting jig.

Then, as shown in FIG. 20, the attaching jig 16 is allowed to approach the plate-setting jig 17 so that the rising-up piece 25 of the attaching jig 16 is inserted into between the holders 31 adjacent to each other, between the holder 31 and the nipping member 50, and between the holder 31 and the partition plate 36. Then, as shown in FIG. 21, the insulating plate 3 attached on the attaching jig 16 is positioned on the supporting piece 41 of the body part 38 of the holder 31. Thus, the attaching jig 16 enables that a plurality of the insulating plates 3 are collectively attached on a plurality of the holders 31.

When the insulating plates 3 are lined up in the desired order so that the correct insulating plates 3 are positioned on the supporting piece 41, the projection 65 of the identification part 12 and the recess 44 of the corresponding part 43 coincide with each other and as shown in FIG. 9, the projection 65 enters the recess 44 so that one side wall 9 of the insulating plate 3 is placed on the supporting piece 41. On the other hand, when an incorrect insulating plate 3 is positioned on the supporting piece 41, the projection 65 of the identification part 12 and the recess 44 of the corresponding part 43 do not coincide with each other and as shown in FIG. 12, the projection 65 abuts against the upper end surface 41*a* of the supporting piece 41 so that one side wall 9 of the insulating plate 3 is spaced from the supporting piece 41.

Figure 10:
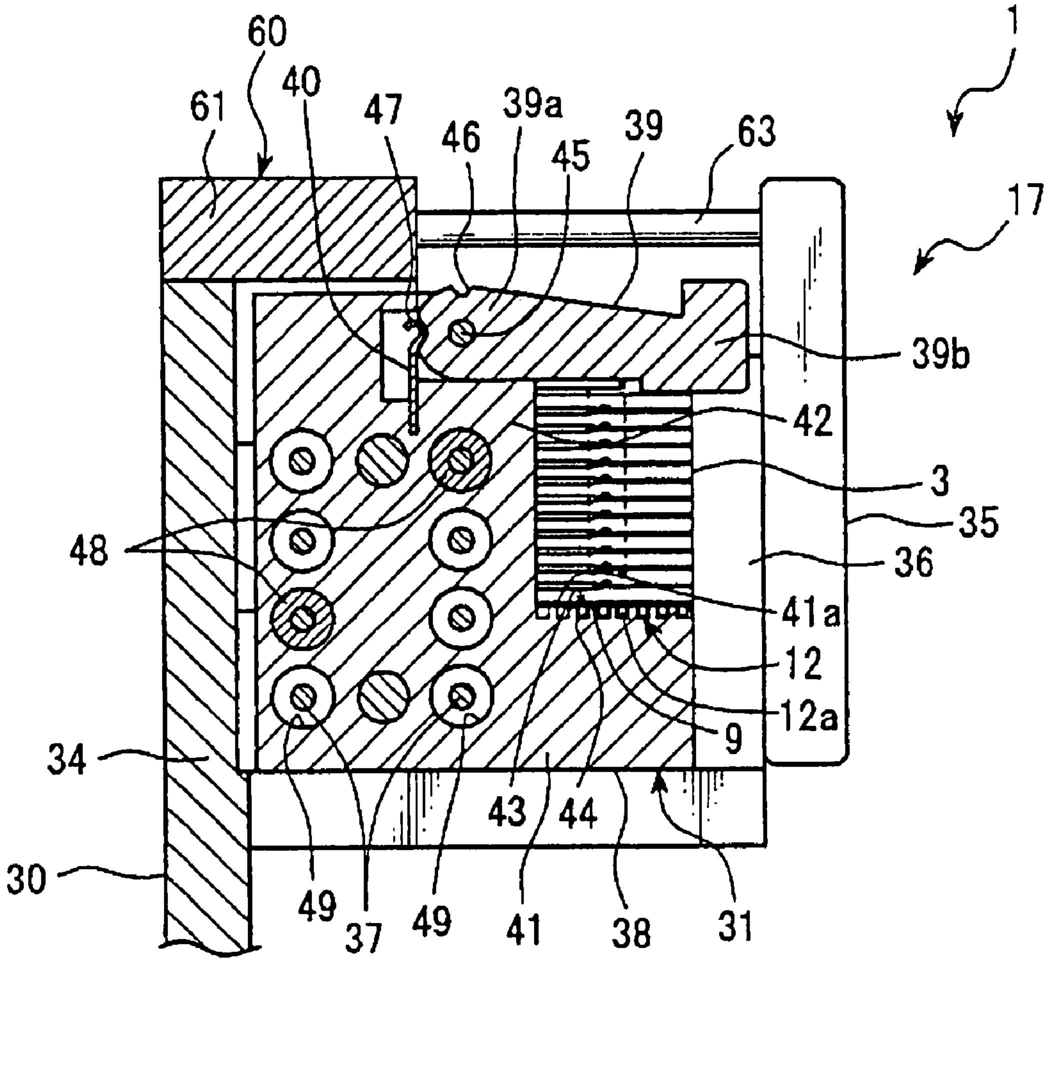
FIG. 10 is a cross sectional view illustrating a state when an insulating plate is nipped between a body part and a lever member of the holder of the plate-setting jig shown in FIG. 9.
Figure 11:
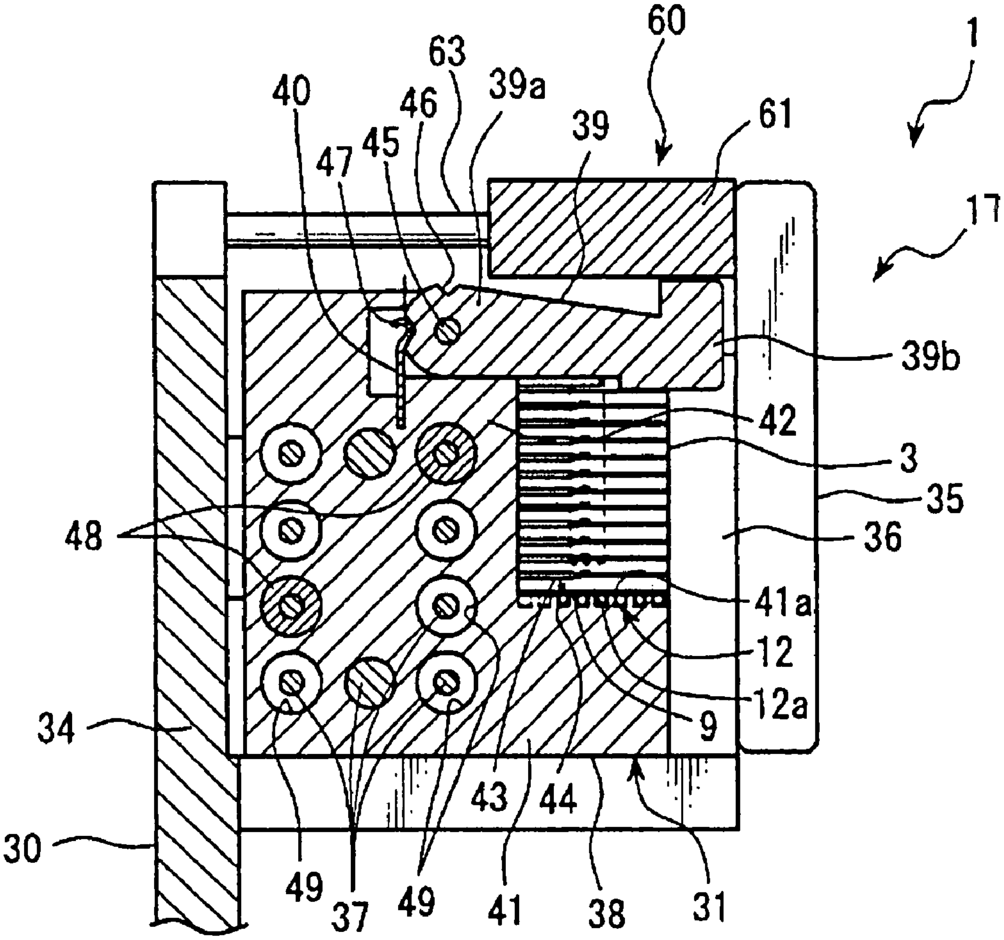
FIG. 11 is a cross sectional view illustrating a state when a sliding member of the plate-setting jig shown in FIG. 10 is positioned at the allowed position.
Figure 15:
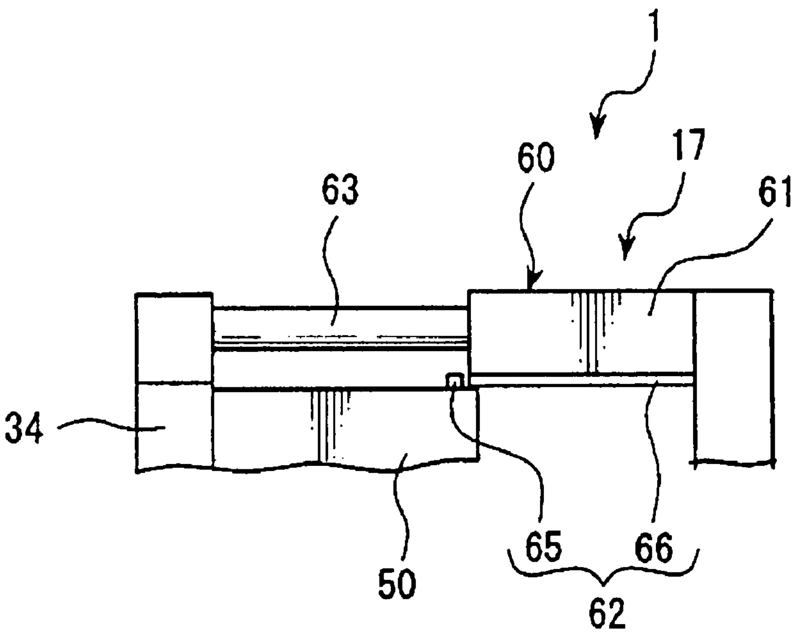
FIG. 15 is a side view illustrating a positional relationship between a projection and an interfering protrusion of the restricting means of the plate-setting jig shown in FIG. 11.
Figure 22:
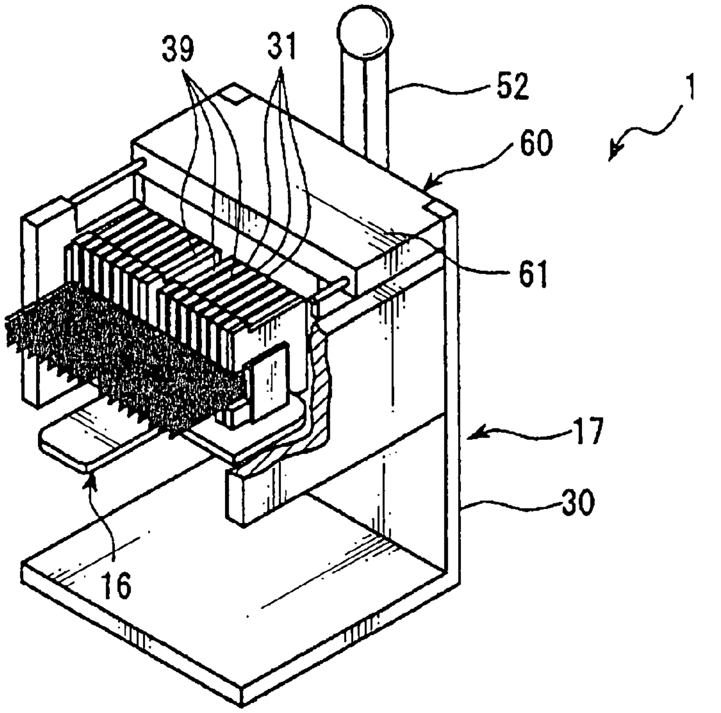
FIG. 22 is a perspective view illustrating a state when the insulating plate is nipped between the body part and the lever member of the holder of the plate-setting jig shown in FIG. 21.
Figure 23:
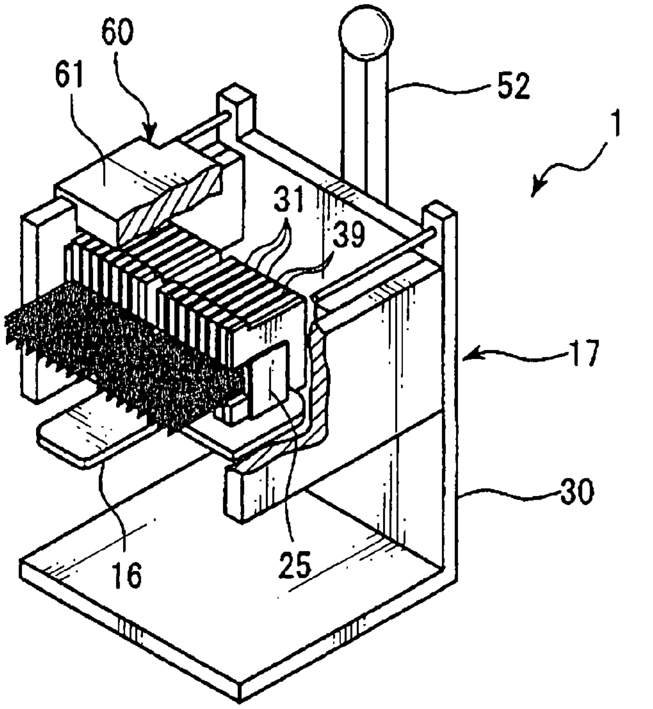
FIG. 23 is a perspective view illustrating a state when the sliding member of the plate-setting jig shown in FIG. 22 is positioned at the allowed position.

Thereafter, the lever member 39 of the holder 31 is rotated around one end 39*a* of the lever member 39 and as shown in FIGS. 10 and 22, the insulating plate 3 is nipped between the lever member 39 and the body part 38. Then, the sliding member 61 is moved from the detachable position toward the allowed position. Then, as shown in FIGS. 11 and 23, the sliding member 61 is positioned at the allowed position. As shown in FIG. 15, the projection 65 and the interfering protrusion 66 are spaced from each other in a direction crossing at right angles the direction in which the holders 31 approach each other.

Figure 24:
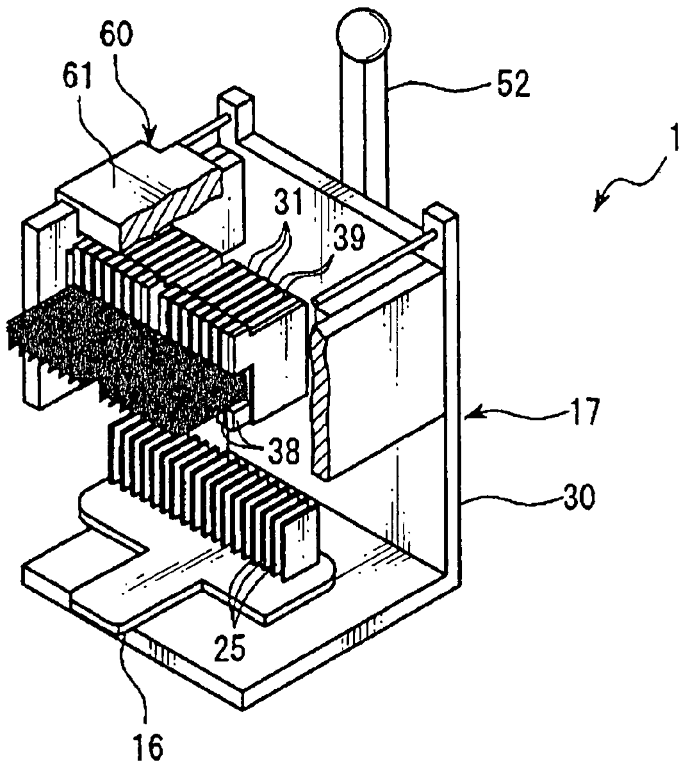
FIG. 24 is a perspective view illustrating a state when the attaching jig is removed from the plate-setting jig shown in FIG. 23.
Figure 25:
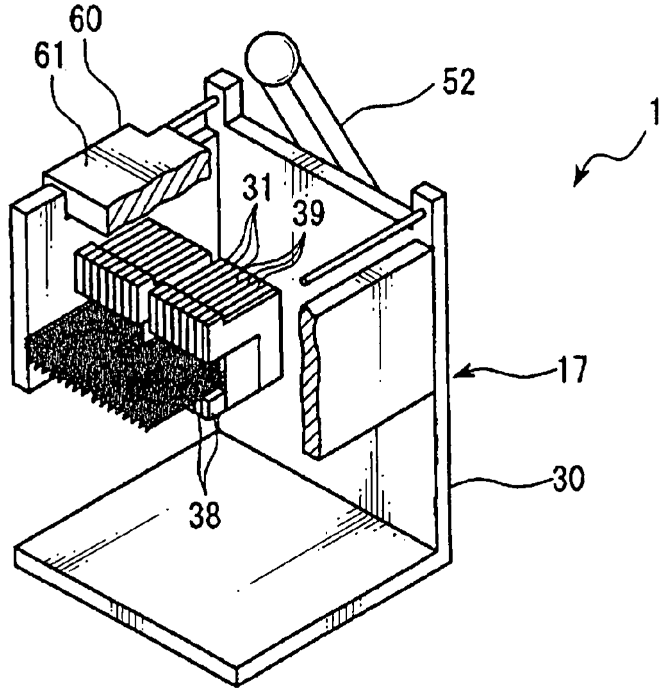
FIG. 25 is a perspective view illustrating a state when an operation lever of the plate-setting jig shown in FIG. 24 is rotated.
Figure 26:
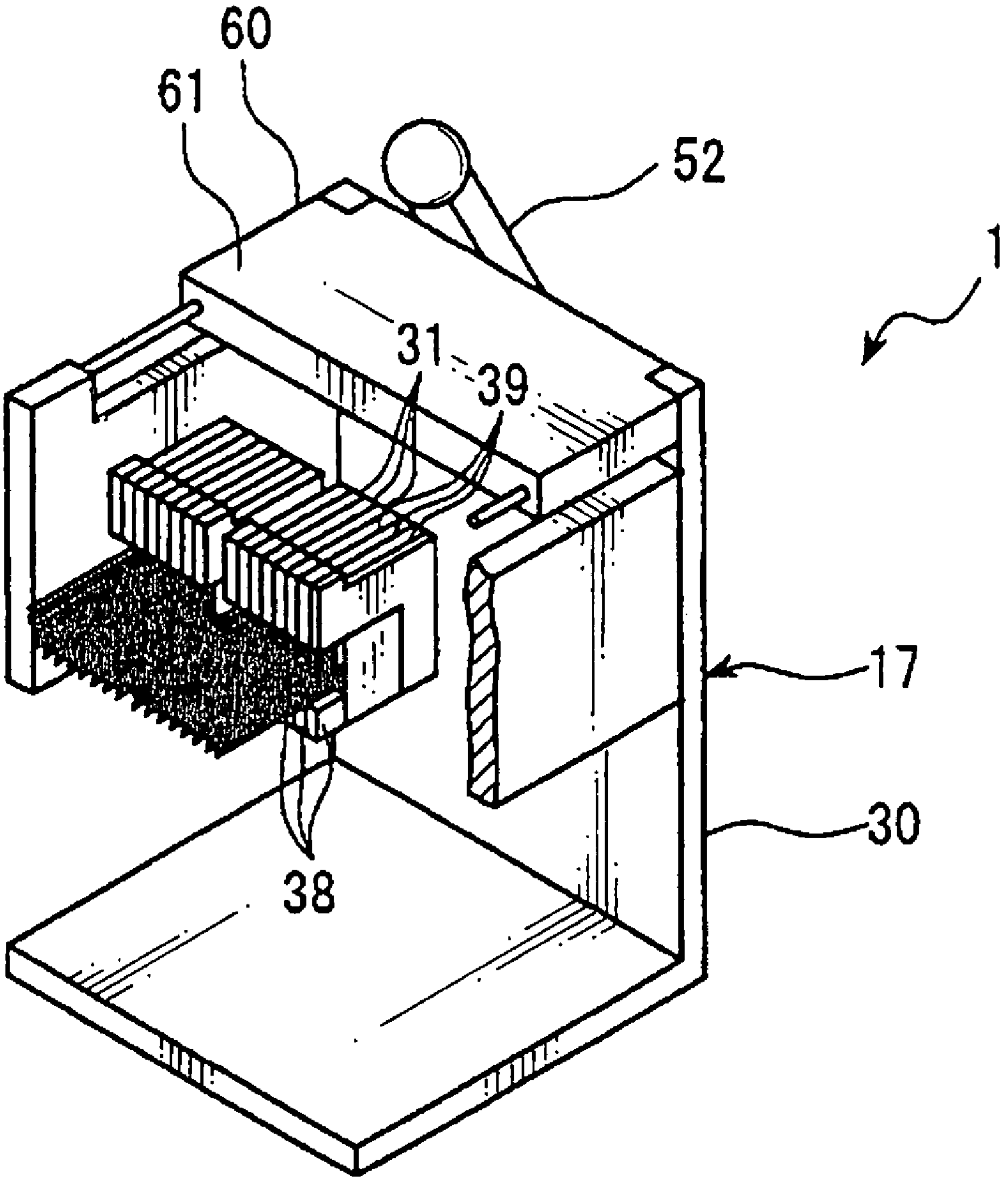
FIG. 26 is a perspective view illustrating a state when the sliding member of the plate-setting jig shown in FIG. 25 is positioned at the detachable position.
Figure 27:
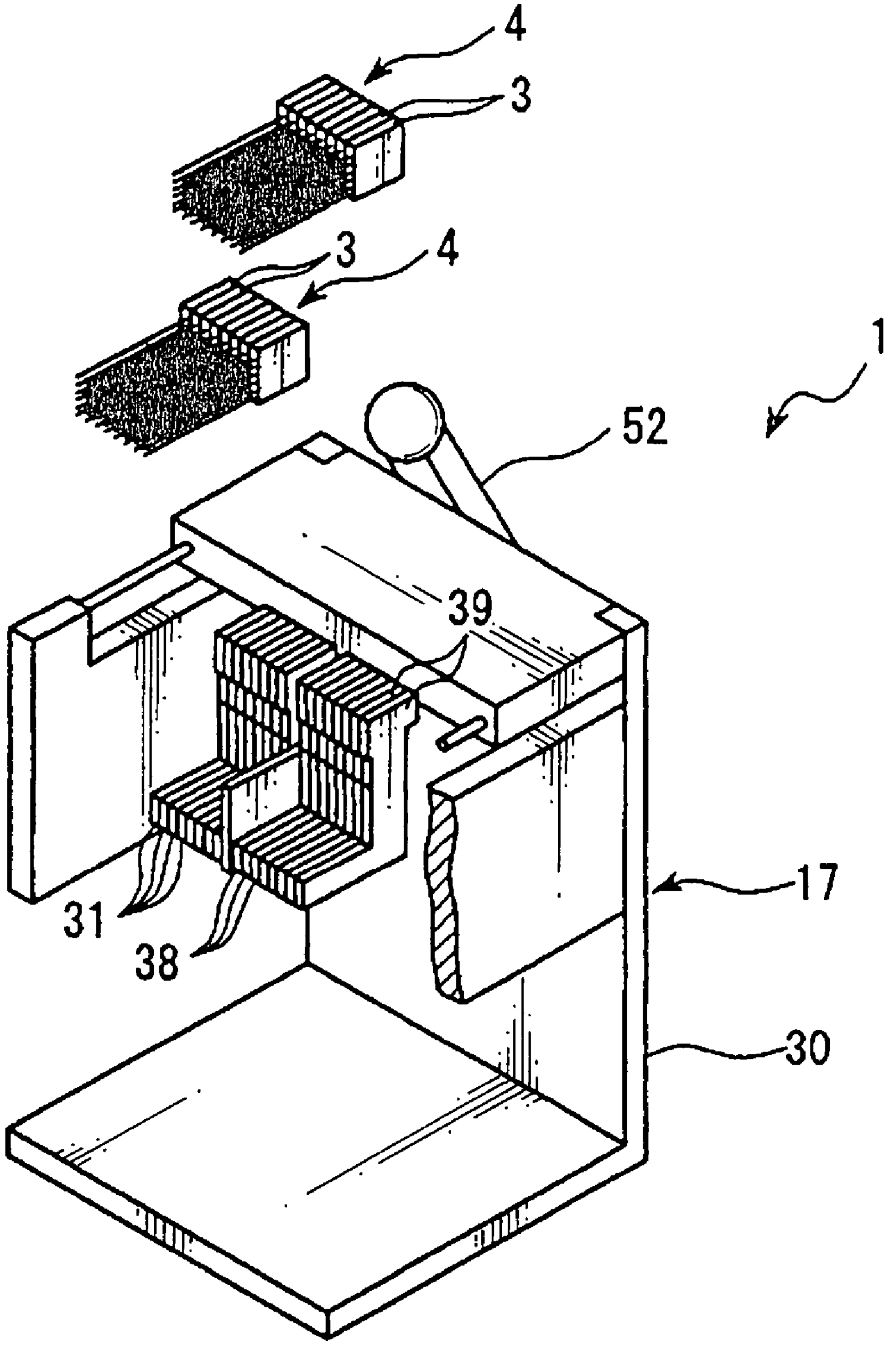
FIG. 27 is a perspective view illustrating a state when a connector assembled by combining the insulating plates is removed from the plate-setting jig shown in FIG. 26.

Then, as shown in FIG. 24, the attaching jig 16 is removed from the plate-setting jig 17 and thereafter as shown in FIG. 25, the operation lever 52 is rotated to cause the holders 31 to approach each other so as to combine the insulating plates 3. As shown in FIG. 26, the sliding member 61 is positioned at the detachable position and thereafter as shown in FIG. 27, the connector 4 which is assembled by combining the insulating plates 3 is removed from the plate-setting jig 17 and thereafter, the operation lever 52 is reversely rotated so as to position the holders 31 at the farthest positions from each other. Thus, the insulating plates 3 are combined with one another so as to assemble the connector 4.

Figure 12:
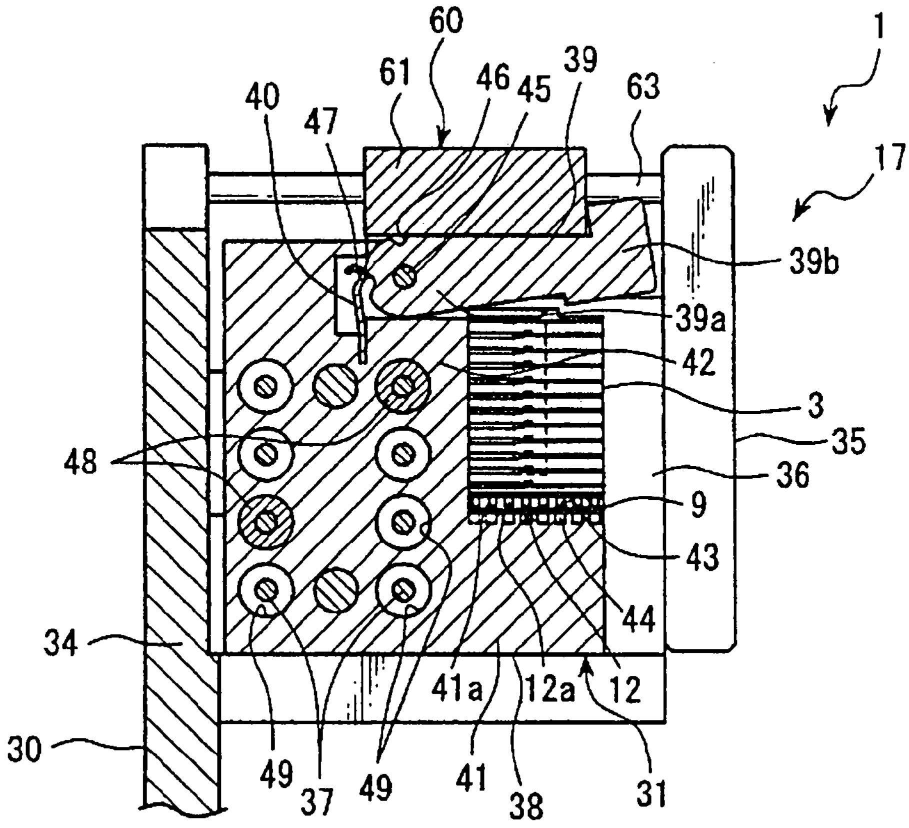
FIG. 12 is a cross sectional view illustrating a state when an incorrect insulating plate is attached on the holder of the plate-setting jig shown in FIG. 11.
Figure 16:
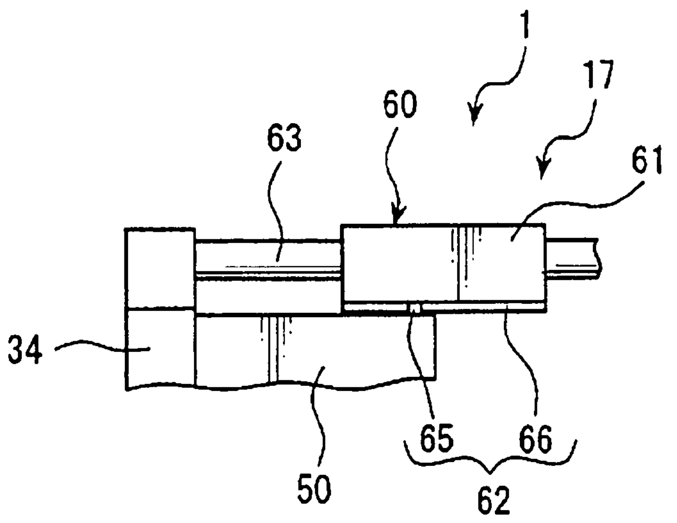
FIG. 16 is a side view illustrating a positional relationship between a projection and an interfering protrusion of the restricting means of the plate-setting jig shown in FIG. 12.

When at least one holder 31 attaches an incorrect insulating plate 3, as shown in FIG. 12, the lever member 39 and the sliding member 61 interfere with each other so that the sliding member 61 is positioned near to the allowed position and also nearer to the detachable position than the allowed position. Then, as shown in FIG. 16, the projection 65 and the interfering protrusion 66 are lined up in the direction in which the holders 31 approach each other, therefore the projection 65 and the interfering protrusion 66, that is, the restriction part 62 prevents the nipping members 50 from approaching each other, so that the operation lever 52 is unable to rotate. In such a case, first, all the correct insulating plates 3 are attached on the respective holders 31 and thereafter, the operation lever 52 is rotated to combine the insulating plates 3 so as to assemble the connector 4.

According to the preferred embodiment described above, the erroneous attaching-preventing part 60 is provided on both the combining part 32 and the sliding member 61. When the sliding member 61 is not positioned at the allowed position, that is, when at least one holder 31 attaches an incorrect insulating plate 3, the erroneous attaching-preventing parts 60 interfere with each other so as to prevent the holders 31 from approaching each other.

Therefore, even if there is aging and a manner of setting of the insulating plates 3 on the holders 31 is changed, since the erroneous attaching-preventing part 60 is provided on both the combining part 32 and the sliding member 61, therefore when at least one holder 31 attaches an incorrect insulating plate 3, the erroneous attaching-preventing parts 60 securely interfere with each other so as to prevent the holders 31 from approaching each other.

Therefore, by knowing whether or not the holders 31 approach each other, it can be correctly known whether or not the desired (i.e. correct) insulating plates 3 are attached on the holders 31, that is, it can be correctly known whether or not the insulating plates 3 are lined up according to a predetermined order.

The erroneous attaching-preventing part 60 includes the projection 65 formed projecting from the nipping member 50 of the combining part 32 and the interfering protrusion 66 formed projecting from the sliding member 61. When, the sliding member 61 is positioned nearer to the detachable position than the allowed position, the projection 65 and the interfering protrusion 66 are lined up along the direction in which the holders 31 approach each other. Therefore, when the sliding member 61 is positioned nearer to the detachable position than the allowed position, that is, when an incorrect insulating plate 3 is attached on the holder 31, the projection 65 and the interfering protrusion 66 securely interfere with each other.

Therefore, by knowing whether or not the holders 31 approach each other, it can be correctly known whether or not the desired (i.e. correct) insulating plates 3 are attached on the holders 31, that is, it can be securely known whether or not the insulating plates 3 are lined up according to a predetermined order.

The attaching jig 16 includes the rising-up piece 25 which rises up from the jig body 24 and nips the insulating plate 3 in cooperation with the adjacent rising-up piece 25 so as to attach the insulating plate 3. Therefore, when the insulating plate 3 is nipped between the rising-up pieces 25 of the attaching jig 16 and the rising-up piece 25 is allowed to enter into between the holders 3, so that the insulating plates 3 are arranged on the body parts 38 of the holder 31. Therefore, a plurality of the insulating plates 3 can be collectively attached on a plurality of the holders 31. Therefore, a time required to attach the insulating plates 3 on the holders 31 can be shortened, that is, a time to assemble the connector 4 can be shortened.

The entering piece 20, which enters into between the rising-up pieces 25 of the attaching jig 16, includes the notch part 23 as the second corresponding part which corresponds to the identification part 12 of the insulating plate 3. Therefore, it can be easily known whether or not the desired (i.e. correct) insulating plate 3 is nipped between the rising-up pieces 25 adjacent to each other of the attaching jig 16. Therefore, it can be easily known whether or not the insulating plates 3 are lined up according to a predetermined order.

Further, since the provisional placing jig 15 and the attaching jig 16 are separated from each other, therefore if the provisional placing jig 15 and the attaching jig 16 both having a simple structure are arranged on a wiring plate 18 and the holders 31 and the combining part 32 having a complicated structure are arranged on a transfer path of the wiring plate 18, the insulating plates 3 attached on a plurality of the wiring plates 18 can be securely combined with each other by providing only one holder 31 and one combining part 32 each of which has a complicated structure and is costly.

The aforementioned preferred embodiments are described to aid in understanding the present invention and variations may be made by one skilled in the art without departing from the spirit and scope of the present invention. For example, instead of rotating the operation lever 52, the holders 31 may be caused to approach and leave each other by using a motor or a cylinder. It may be confirmed the position of the sliding member 61 and existence or non-existence of the attaching of the attaching jig 16 on the plate-setting jig 17 by using a sensor. The sliding member 61 may include the projection 65 and the nipping member 50 may include the interfering protrusion 66. In such a case, the projection 65 is positioned between the interfering protrusions 66. A pressure welding terminal may be used instead of the crimp terminal 2.

What is claimed is:

1. An insulator-combining apparatus for assembling a connector by laminating electrical insulators each holding a plurality of terminals in a lined-up form, said insulator including a wall on which the terminal is placed and an identification part which indicates an order of lamination upon the assembling of the connector, the apparatus comprising:

a plurality of holders which approach and leave each other, attach the insulators thereon on a condition which a plurality of walls are spaced from each other, and each include first corresponding parts corresponding to the identification parts of the corresponding insulators;

a combining part which causes the holders to approach each other and laminates the insulators; and an erroneous attaching-preventing means which permits the holders to approach each other when the insulators each having the correct identification parts corresponding to the holders are attached on the holders and prevents the holders from approaching each other when at least one holder attaches the insulator having an incorrect identification part, wherein the holder includes:

a body part provided with said first corresponding part; and a nipping part, one end part of which is rotatably provided with the body part, and which nips the insulator between the body part and the nipping part when the insulator having a correct identification part corresponding to the first corresponding part is attached on the body part, wherein the erroneous attaching-preventing means includes:

a sliding member which is provided slidably in a direction crossing at right angles, a direction in which the holders approach each other between an allowed position where the sliding member is placed on an opposite end part of the nipping part and permits the combining part to cause the holders to approach each other and a detachable position where the sliding member causes the insulator to be attachable on or detachable from the holder, and interferes with the nipping part of the holder, on which an incorrect insulator is attached, so as to be prevented from being positioned at the allowed position; and restricting means which are provided on both the combining part and the sliding member, and interfere with each other so as to prevent the combining part from causing the holders to approach each other when the sliding member is positioned nearer to the detachable position than the allowed position.

2. The insulator-combining apparatus according to claim 1, wherein the combining part includes a pair of nipping members which position a plurality of the holders therebetween and approach each other so as to cause the holders to approach each other, wherein the restricting means includes:

a projection which projects from one of the nipping member and the sliding member; and an interfering protrusion which is provided on another of the nipping member and the sliding member and is lined up with the projection along a direction in which the holders approach each other when the sliding member is positioned nearer to the detachable position than the allowed position, and is spaced from the projection along a direction crossing at right angles, a direction in which the holders approach each other when the sliding member is positioned at the allowed position.

3. The insulator-combining apparatus according to claim 2 further comprising an attaching jig which attaches collectively the insulators on the holders, wherein the attaching jig includes:

a jig body; and rising-up pieces arranged being spaced from each other, said rising-up piece rising up from the jig body and being capable of entering into between the holders adjacent to each other, wherein the insulator is held by being nipped in between the rising-up pieces adjacent to each other and the rising-up pieces are inserted in between the respective holders, so that the insulators are attached on the respective holders.

4. The insulator-combining apparatus according to claim 3 further comprising a provisional placing jig which detachably attaches the attaching jig and to which the insulator is attached on a condition that the attaching jig is attached to the provisional placing jig, wherein the provisional placing jig includes:

a provisional placing jig body which is capable of attaching the attaching jig;

an entering piece which is capable of entering in between the rising-up pieces adjacent to each other of the attaching jig attached to the provisional placing jig body, the identification part of the insulator being placed on an end surface of the entering piece; and a second corresponding part which is provided on the end surface of the entering piece and corresponds to the identification part of the corresponding insulator.

* * * * *